United States Patent
Babu Balasubramani et al.

(10) Patent No.: US 12,254,383 B2
(45) Date of Patent: Mar. 18, 2025

(54) INTELLIGENT REAL-TIME DEFECT PREDICTION, DETECTION, AND AI DRIVEN AUTOMATED CORRECTION SOLUTION

(71) Applicant: Accenture Global Solutions Limited, Dublin (IE)

(72) Inventors: Shoban Babu Balasubramani, Bangalore (IN); Tuhin Kanti Mondal, Kolkata (IN); Atanu Mondal, Paschim Bardhaman (IN)

(73) Assignee: Accenture Global Solutions Limited, Dublin (IE)

( * ) Notice: Subject to any disclaimer, the term of this patent is extended or adjusted under 35 U.S.C. 154(b) by 665 days.

(21) Appl. No.: 17/218,113

(22) Filed: Mar. 30, 2021

(65) Prior Publication Data
US 2022/0318667 A1    Oct. 6, 2022

(51) Int. Cl.
| | | |
|---|---|---|
| *G06N 20/00* | (2019.01) | |
| *G01N 21/95* | (2006.01) | |
| *G06N 3/04* | (2023.01) | |
| *G06N 3/08* | (2023.01) | |
| *G06T 7/00* | (2017.01) | |

(52) U.S. Cl.
CPC ............ *G06N 20/00* (2019.01); *G01N 21/95* (2013.01); *G06N 3/04* (2013.01); *G06N 3/08* (2013.01); *G06T 7/0006* (2013.01)

(58) Field of Classification Search
CPC ............ G06N 20/00; G06N 3/04; G06N 3/08; G01N 21/95; G01N 2021/8883; G06T 7/0006; G06T 7/0004
See application file for complete search history.

(56) References Cited

U.S. PATENT DOCUMENTS

| | | | | | |
|---|---|---|---|---|---|
| 3,932,042 | A | * | 1/1976 | Faani | B07C 5/126 209/524 |
| 3,983,479 | A | * | 9/1976 | Lee | G01R 31/2853 324/537 |
| 6,025,910 | A | * | 2/2000 | Lucas | B07C 5/3408 356/240.1 |
| 6,205,239 | B1 | * | 3/2001 | Lin | G01N 21/95607 382/209 |
| 6,314,201 | B1 | * | 11/2001 | Roder | G01R 31/71 382/106 |
| 6,563,324 | B1 | * | 5/2003 | Nichani | G06T 7/001 324/537 |

(Continued)

*Primary Examiner* — Solomon G Bezuayehu

(57) ABSTRACT

Aspects of the present disclosure provide systems, methods, and computer-readable storage media that support detection and mitigation of defects occurring in outputs of a process. A modelling engine creates and trains models to identify defects occurring in outputs of a process or system. A set of causation rules may be created and trained to identify causes of different defects identifiable via the models and a set of control rules may be created and trained to generate control data that may mitigate the causes of identified defects. A process monitoring device incorporating the trained models and rules may then be used to monitor the process and detect defects using the models. Once a defect is detected, the rules may be applied to determine the cause of the defect and then control data may be generated to modify the process such that further occurrences of the defect are reduced or eliminated.

20 Claims, 8 Drawing Sheets

(56) References Cited

U.S. PATENT DOCUMENTS

| | | | | |
|---|---|---|---|---|
| 6,621,566 | B1* | 9/2003 | Aldrich | G01R 31/309 356/237.4 |
| 7,075,565 | B1* | 7/2006 | Raymond | G01N 21/95684 348/126 |
| 8,149,989 | B2* | 4/2012 | Schnell | B65G 43/02 378/58 |
| 8,670,032 | B2* | 3/2014 | Hermann | G01N 21/9036 348/125 |
| 10,491,788 | B2* | 11/2019 | Hartrumpf | G06T 7/0008 |
| 10,697,899 | B1* | 6/2020 | Park | G01N 21/8851 |
| 10,812,727 | B1* | 10/2020 | Kempf | H04N 23/69 |
| 11,137,691 | B1* | 10/2021 | Chang | G03F 1/70 |
| 11,320,385 | B2* | 5/2022 | Loken | G01N 21/8851 |
| 2001/0054680 | A1* | 12/2001 | Lindner | G01N 21/9036 250/223 B |
| 2002/0057830 | A1* | 5/2002 | Akin | H05K 13/0815 382/147 |
| 2002/0159643 | A1* | 10/2002 | DeYong | H05K 13/0815 382/170 |
| 2003/0113009 | A1* | 6/2003 | Mueller | G06T 7/521 382/147 |
| 2003/0146285 | A1* | 8/2003 | Moore | G06K 7/10861 235/462.48 |
| 2004/0010444 | A1* | 1/2004 | Delorme | G01R 31/281 702/183 |
| 2007/0047797 | A1* | 3/2007 | Vilella | G06T 7/0004 382/141 |
| 2010/0007896 | A1* | 1/2010 | Fishbaine | G01N 21/8806 356/603 |
| 2010/0166253 | A1* | 7/2010 | Moore | G06V 10/267 382/100 |
| 2010/0260378 | A1* | 10/2010 | Noy | G06T 7/12 382/103 |
| 2011/0026804 | A1* | 2/2011 | Jahanbin | G06T 7/45 382/141 |
| 2011/0157577 | A1* | 6/2011 | Dohse | G03F 7/70791 355/72 |
| 2011/0248083 | A1* | 10/2011 | Bonner | G06V 20/52 235/375 |
| 2012/0224666 | A1* | 9/2012 | Speller | G01T 1/1603 378/8 |
| 2013/0173508 | A1* | 7/2013 | Anayama | G01N 21/892 706/12 |
| 2013/0219696 | A1* | 8/2013 | Kurita | G06T 7/001 348/135 |
| 2014/0050389 | A1* | 2/2014 | Mahadevan | G06T 7/0004 382/149 |
| 2014/0168643 | A1* | 6/2014 | Lin | G01N 21/958 356/239.3 |
| 2014/0198185 | A1* | 7/2014 | Haugen | G06T 7/521 348/47 |
| 2014/0210982 | A1* | 7/2014 | Zuo | G06T 7/001 382/145 |
| 2014/0320633 | A1* | 10/2014 | Haugen | H04N 23/74 348/87 |
| 2015/0051860 | A1* | 2/2015 | Zuo | G01N 21/956 702/82 |
| 2015/0177157 | A1* | 6/2015 | Edmondson | G06T 7/0004 348/125 |
| 2015/0233888 | A1* | 8/2015 | Chapman | B65H 63/061 73/160 |
| 2015/0241457 | A1* | 8/2015 | Miller | G01N 21/84 382/103 |
| 2015/0348253 | A1* | 12/2015 | Bendall | H04N 7/183 348/86 |
| 2015/0355102 | A1* | 12/2015 | Kido | G06T 7/0004 348/46 |
| 2016/0109380 | A1* | 4/2016 | Huibregtse | G01N 21/909 356/240.1 |
| 2016/0270274 | A1* | 9/2016 | Toyoda | H05K 13/08 |
| 2016/0321796 | A1* | 11/2016 | Dordoni | G01B 11/254 |
| 2016/0371568 | A1* | 12/2016 | Tin | G06F 18/24155 |
| 2017/0154417 | A1* | 6/2017 | Niedermeier | H04N 13/254 |
| 2017/0236266 | A1* | 8/2017 | Rostami | H04N 23/56 348/131 |
| 2018/0018519 | A1* | 1/2018 | O'Brien | G06F 40/117 |
| 2018/0143214 | A1* | 5/2018 | Bueren | G01N 35/00603 |
| 2018/0144455 | A1* | 5/2018 | Van Schelven | G01N 21/90 |
| 2018/0195974 | A1* | 7/2018 | Kress | H04N 7/181 |
| 2018/0350060 | A1* | 12/2018 | Nakao | G06T 7/194 |
| 2019/0011252 | A1* | 1/2019 | Moeller | B05C 21/00 |
| 2019/0101885 | A1* | 4/2019 | Oya | G05B 19/058 |
| 2019/0137982 | A1* | 5/2019 | De | G05B 17/02 |
| 2019/0164265 | A1* | 5/2019 | Liao | G06T 7/001 |
| 2019/0257692 | A1* | 8/2019 | Cochran | G06T 3/073 |
| 2019/0283445 | A1* | 9/2019 | Sones | B41J 11/0095 |
| 2019/0285554 | A1* | 9/2019 | Konishi | G06T 1/00 |
| 2019/0362486 | A1* | 11/2019 | Diao | G06T 7/0004 |
| 2019/0392602 | A1* | 12/2019 | Lloyd | G06T 7/73 |
| 2020/0173964 | A1* | 6/2020 | Hudson | G01N 29/0645 |
| 2020/0175669 | A1* | 6/2020 | Bian | G06T 7/0004 |
| 2020/0208966 | A1* | 7/2020 | Pérez Cortés | B07C 5/366 |
| 2020/0242462 | A1* | 7/2020 | Friedman | H10N 50/10 |
| 2020/0281519 | A1* | 9/2020 | Gowans | A61F 13/0206 |
| 2020/0380899 | A1* | 12/2020 | Wen | G06T 7/0008 |
| 2021/0027424 | A1* | 1/2021 | Petruk | G06T 7/80 |
| 2021/0048395 | A1* | 2/2021 | Will | H04N 7/18 |
| 2021/0116387 | A1* | 4/2021 | Hewicker | G01N 21/8851 |
| 2021/0124994 | A1* | 4/2021 | Buibas | G06V 10/10 |
| 2021/0125373 | A1* | 4/2021 | Gauthier | G06T 7/75 |
| 2021/0131895 | A1* | 5/2021 | Forestelli | G06T 7/001 |
| 2021/0209739 | A1* | 7/2021 | Wen | H01M 10/4285 |
| 2021/0262945 | A1* | 8/2021 | Schlezinger | G01N 21/9508 |
| 2021/0326603 | A1* | 10/2021 | Kempf | G06V 10/147 |
| 2021/0364448 | A1* | 11/2021 | Mekala | G01N 21/95607 |
| 2022/0007589 | A1* | 1/2022 | Binney | G06T 7/0012 |
| 2022/0062997 | A1* | 3/2022 | Liu | B33Y 30/00 |
| 2022/0091597 | A1* | 3/2022 | Koseki | G06Q 10/063 |
| 2022/0120727 | A1* | 4/2022 | Al-Dabbagh | G06F 11/3065 |
| 2022/0172100 | A1* | 6/2022 | Balasubramanian | G06V 10/776 |
| 2022/0318667 | A1* | 10/2022 | Babu Balasubramani | G06N 3/08 |
| 2022/0327798 | A1* | 10/2022 | Müller | G01B 11/0608 |
| 2022/0343178 | A1* | 10/2022 | Hall | G06N 3/08 |
| 2022/0366558 | A1* | 11/2022 | Bufi | G06V 10/764 |

* cited by examiner

INTELLIGENT REAL-TIME DEFECT PREDICTION, DETECTION, AND AI DRIVEN AUTOMATED CORRECTION SOLUTION

TECHNICAL FIELD

The present disclosure relates generally to process monitoring systems and more specifically to systems for automated detection and mitigation of defects or abnormalities for a monitored process.

BACKGROUND

As technology continues to advance, opportunities to incorporate automation are increasingly sought out to improve operating efficiency, reduce costs (e.g., due to less manual workforce being required), or for other reasons. While automation of processes may increase the speed of the processes, reduce the costs associated with executing the processes, and reduce human effort, automation does not reduce the risk of defects occurring during the process(es). For example, during execution of a steel casting process various types of defects may occur. Since the automated process does not reduce the risk of defects being generated, the defects may continue to occur throughout the execution process, potentially resulting in the process producing a significant quantity of defective output (e.g., steel containing defects). To address the defect issues, an entity may implement a manual inspection process to monitor the output of the process and detect defects. However, there are many processes where such techniques are not capable of detecting defects in an efficient manner.

To illustrate, in the above-mentioned steel casting process slabs of steel may be produced by pouring molten metal into a mold. The mold may be configured to form the molten metal into a desired shape. The mold or portions of the mold (e.g., the rollers) may be cooled as the molten metal passes through the mold and mold powder may be used to lubricate the molten steel as it passes through the mold. As the molten metal passes through the mold heat may be removed (e.g., by the cooling of the mold), which may help form a solid surface on the metal, but the interior of the metal may remain molten. Once the metal exits the mold it may be passed through a spray chamber where water is sprayed on the surface to further solidify the cast steel. It is noted that, when the metal exits the mold and the spray chamber it may still be extremely hot but may be sufficiently solid to allow the metal to be moved (e.g., via rollers, etc.). Portions of the metal may subsequently be separated or isolated from the output of the molding process and the spray chambers to produce pieces of metal that are more manageable (e.g., more easily moved, such as by a crane, a rail car, or other techniques).

The pieces of metal, once separated from the mold, may be stored and cooled to a desired temperature—however, to avoid cracking or other defects, the pieces of metal may need to be cooled slowly over a period of days or weeks and it may be months before the slab of metal may be processed into a metal product (e.g., via cold rolling or another process). It is noted that in some configurations the outputs of the mold may be subjected to further processing, such as additional heating, descaling, or other types of processes. Regardless of the types of processing that may occur following the molding process, various types of defects may occur. Due to the prolonged period of time required for cooling and processing it may be difficult to observe defects in a timely manner (e.g., in time to modify or alter the process to prevent or minimize further occurrences of the defect) via manual inspection. As a result of the inefficiencies of current techniques, many slabs (e.g. pieces of steel output by the casting process) may be produced before any defects are detected.

SUMMARY

Aspects of the present disclosure provide systems, methods, and computer-readable storage media that support detection and mitigation of defects occurring in output of a process. A process monitoring device may be provided to monitor operations of a process or system, such as a manufacturing process/system, and to detect occurrences of defects in the output of the monitored process/system. The process monitoring device may include or be communicatively coupled to several types of sensors to capture information that may be used to evaluate the monitored process. For example, the sensors may include cameras to capture image and/or video content associated with the process, temperature sensors to capture temperature information, or other types of sensors. The process monitoring device may receive sensor data from the sensor(s) and evaluate the sensor data to detect occurrences of defects.

To evaluate the sensor data, the process monitoring device may be configured to generate and train models using machine learning techniques. For example, the process monitoring device may compile a dataset that may include historical information associated with previous execution cycles of the process and outputs of the previous execution cycles of the process. In some aspects the dataset may also include structured data, unstructured data, lab reports, or other types of data that include information that may be used to train the model. To facilitate the training, a portion of the dataset may be labelled, such as to label the portion of the dataset as being associated with a defect or not being associated with a defect. During the training, the model may learn to identify defects in outputs of the process based at least partially on the labels. In an aspect, the labelled portion of the dataset may include media content, such as images of steel taken at various times during a steel casting process or a steel processing process (e.g., a cold rolling process). In an aspect, media content of the dataset may be subjected to one or more transformations to translate the media content into a format that may be ingested by the model, such as a matrix of numeric values representative of the information depicted in the media content. In an aspect, the transformations may include a color transform configured to translate information (e.g., color information) of the media content into a format that may be analyzed by the model and/or may include a grayscale transform configured to translate information (e.g., contrast information) of the media content into a format that may be analyzed by the model. Utilizing the transforms and other data processing techniques, the process modelling device may create the dataset that may be used to train the model (e.g., a computer vision (CV) model) to detect defects occurring during execution of the process. The trained model may be validated and its performance evaluated to verify that the model accurately identifies defects. If the model's performance does not achieve a threshold performance level based on the training, the process monitoring device may be configured to perform additional training to improve the model's performance and accuracy. In addition to CV-type models capable of analyzing the transformed image data, embodiments may also utilize other types of machine learning models to monitor performance of a process or system. For example, a prediction model may be obtained or created and trained to analyze the process or system (e.g., prior to starting an execution cycle or during the execution cycle) to predict the types of defects expected to occur. The prediction model may be trained based on a portion of the historical data and/or the outputs of the CV model. Over time, the accuracy of the prediction model may be improved and may, to some extent, allow accurate predictions for some defects before the execution cycle of the process or system even starts. This may allow predicted defects to be addressed before they occur. Any defects that are not or cannot be accurately predicted by the prediction model may be identified, including the severity and impact of the defects, by the CV model.

In addition to using machine learning type models, the process monitoring device may be configured to generate a set of rules for mitigating further occurrences of defects detected by the model. For example, the set of rules may include causation rules that are configured to determine the cause of a defect detected by the model. The set of rules may also include process control rules and quality control rules. The process control rules may be configured to determine modifications to parameters of the process to mitigate the causes of the defects and the quality control rules may be configured to modify inputs to the process to mitigate defects caused by the process inputs. The set of rules may be configured based on various types of information included in the compiled dataset, such as lab reports or other information. Once the set of rules is created, it may be used to determine causes of detected defects and to generate control data to modify operational parameters of the process and/or modify inputs to the process, where the modifications are configured to mitigate further occurrences of an observed defect.

Once performance of the model satisfies a threshold performance level and the set of rules is created, the model and rules may be utilized by the process monitoring device to detect and mitigate defects occurring during the monitored process. For example, information associated with inputs to the process and the process parameters may be collected during initialization of the process. Once initialized, execution of the process may begin, and information may be collected by the sensors or via other techniques as the process is monitored. The information collected from the initialization of the process and during the monitoring may then be evaluated using the model to predict and detect defects that occur. When a defect is detected, the process monitoring device may then evaluate the defect against the set of rules to determine a cause of the defect (e.g., using the causation rules) and to determine control data (e.g., using the control rules) for modifying the process to mitigate further occurrences of the defect. The control data may be used to modify the operating parameters (or inputs) of the process to mitigate future occurrences of detected defects.

Monitoring a process or system using embodiments of the present disclosure may enable defects and abnormalities to be detected more rapidly as compared to traditional defect detection techniques. For example, using media content captured by sensors (e.g., cameras) may enable defects in steel to be detected much sooner than the manual inspection techniques presently used. In addition to detection of defects, embodiments may also enable the severity and impact of the defects to be analyzed (e.g., using deep learning techniques). Additionally, utilizing the causation and control rules of embodiments enables causes of detected defects to be identified and control data to be determined for modifying the process such that the detected defects do not occur or occur less frequently in the future. Moreover, the ability to train the various models and rules utilized by embodiments may enable new and emerging defects to be learned by the models over time, allowing rapid correction and mitigation of such emerging defects and promoting efficient operation of the process or system. Additionally, aspects of the present disclosure may also allow a process or system to be analyzed prior to starting a new execution cycle, such as to evaluate control parameters or input parameters to determine whether those parameters may result in a defect. This allows defects to be identified before the defects actually occur and the parameters of the process or system to be adjusted before starting the new execution cycle, thereby reducing waste (e.g., time, cost, etc.) of the process or system and increasing the quality of the outputs provided as a result of the new execution cycle.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support detection and mitigation of defects occurring in outputs of a process. To facilitate detection and mitigation of defects, a process monitoring device may be provided. The process monitoring device may include functionality for creating or obtaining models, and functionality for training the models to identify defects occurring in outputs of a process or system. The training of the models may be configured to leverage computer vision techniques to teach a computer vision model identify defects that may occur in outputs of the monitored process, such as using models and computer vision techniques to detect defects based on media content, and machine learning techniques to teach the model to predict defects that may occur based on parameters of the monitored process or system. The process monitoring device may also be configured to generate a set of rules that includes causation rules (e.g., rules to identify causes of different defects) and control rules (e.g., rules to generate control data for modifying the process).

During the monitoring, data associated with the process may be obtained using sensors or other data collection techniques. The process monitoring device may pre-process portions of the collected data, such as media content, to transform the data to a format that may be evaluated by the models. The collected data may be evaluated against the model to determine whether one or more defects have occurred during the process. The set of rules may then be used to evaluate the outputs of the model to determine the cause of any detected defects and determine modifications to the process to mitigate the defects. Utilizing the disclosed embodiments, a process may be monitored in a manner that enables defects to be rapidly detected and once detected, the causes of the defects may be determined and the process may be modified to mitigate further occurrences of the defects.

Figure 1:
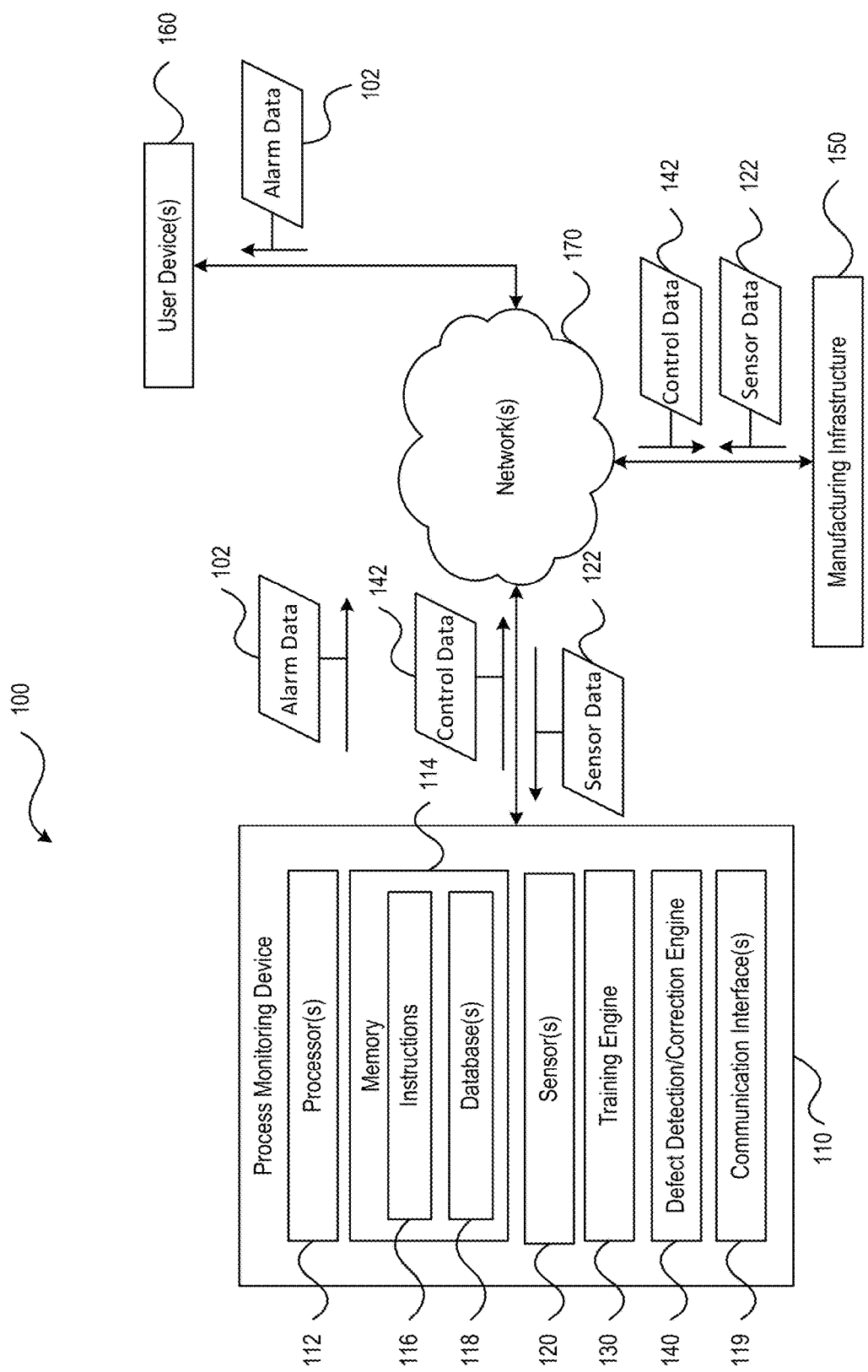
FIG. 1 is a block diagram of an example of a system that supports detection and mitigation of defects occurring in outputs of a process according to one or more aspects of the present disclosure.

Referring to FIG. 1, an example of a system that supports detection and correction of defects according to one or more aspects of the present disclosure is shown as a system 100. As shown in FIG. 1, the system 100 includes a process monitoring device 110. The process monitoring device 110 may be configured to monitor a process or a system. The monitoring may utilize sensors or other types of information to observe portions of the process or system. As described in more detail below, data derived from the monitoring may be analyzed to detect errors, defects, or other types of events that occur during the process or operation of the system. As part of the analysis, machine learning and computer vision techniques may be utilized to evaluate at least a portion of the data derived by the monitoring. A set of rules may be utilized to evaluate the outputs of the machine learning and computer vision analysis to determine whether the process or system is operating correctly or whether a defect or error has occurred. The set of rules may generate information to maintain, modify, and/or control the process or system, such as to correct detected defects and errors, or to maintain a steady (and error/defect free) state of operation. Each of these different operational aspects of the process monitoring device 110 will be described in more detail below.

It is noted that functionalities described with reference to the process monitoring device 110 are provided for purposes of illustration, rather than by way of limitation and that the exemplary functionalities described herein may be provided via other types of computing resource deployments. For example, in some implementations, computing resources and functionality described in connection with the process monitoring device 110 may be provided in a distributed system using multiple servers or other computing devices, or in a cloud-based system using computing resources and functionality provided by a cloud-based environment that is accessible over a network, such as the one of the one or more networks 170. To illustrate, one or more operations described herein with reference to the process monitoring device 110 may be performed by one or more servers or a cloud-based system that communicates with one or more external devices (e.g., manufacturing infrastructure 150 or user device(s) 160) via the one or more networks 170.

As shown in FIG. 1, the process monitoring device 110 includes one or more processors 112, a memory 114, one or more sensors 120, a training engine 130, a defect detection and correction engine 140, and one or more communication interfaces 119. The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the process monitoring device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the process monitoring device 110 may be stored in the memory 114 as instructions 116 that, when executed by the one or more processors 112, cause the one or more processors 112 to perform the operations described herein with respect to the process monitoring device 110. Additionally, the memory 114 may be configured to store data and information, such as one or more databases 118. Illustrative aspects of types of information that may be stored in the one or more databases 118 are described in more detail below.

The one or more communication interfaces 119 may be configured to communicatively couple the process monitoring device 110 to the one or more networks 170 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the process monitoring device 110 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the process monitoring device 110. In some implementations, the process monitoring device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the process monitoring device 110.

The one or more sensors 120 may include temperature sensors, infrared cameras, video cameras, imaging cameras, humidity sensors, or other types of sensors configured to capture data suitable for use in obtaining information during monitoring of a process or external system in accordance with aspects of the present disclosure. In an aspect, the sensors may be disposed at various locations to enable the process or system outputs to be monitored at various locations. It is noted that the specific sensors described above have been provided for purposes of illustration, rather than by way of limitation and that embodiments of the present disclosure may utilize other type of sensors depending on the particular types of monitoring performed by the process monitoring device 110.

The training engine 130 may be configured to support operations for training models and creating/testing rules of the process monitoring device 110. The models may be utilized by the process monitoring device 110 to evaluate and analyze operations of a process or system, such as to identify normal or abnormal operating states or outputs. For example, the models may be evaluated against data generated by or obtained from the sensor(s) 120 to determine whether the process or system is operating in a normal or abnormal fashion. During training, the model may be evaluated against a dataset and then the model may be adjusted or tuned based on performance of the model. Similarly, rules may be used to identify causes of errors or other abnormalities in the operation of the process or system and to determine corrective actions to resolve the detected errors or abnormalities. During the training, rules may be evaluated and analyzed to determine whether the rules correctly identify causes of error conditions and/or to determine whether the rules correctly determine corrective actions to mitigate further instances of the error conditions. Exemplary aspects of the operations and functionality provided by the training engine 130 are described in more detail below.

The defect detection/correction engine 140 may be configured to monitor and analyze a live process or system using data provided by the sensor(s) 120 to detect occurrences of errors or other abnormal conditions of the process or system. For example, a trained and tuned model (and set of rules) may be produced by the training engine 130 and provided to the defect detection/correction engine 140. The defect detection/correction engine 140 may then use the trained model to analyze sensor data obtained from a currently operating process or system to detect abnormal operations or conditions. When abnormal operations or conditions are detected based on the model(s), the defect detection/correction engine 140 may then utilize a set of rules generated based on training by the training engine 130 to evaluate the abnormal operations or conditions to determine the cause and then output control data for modifying the process or system to mitigate further occurrences of the abnormal operations or conditions. Exemplary aspects of the operations and functionality provided by the training engine 130 are described in more detail below.

Figure 2:
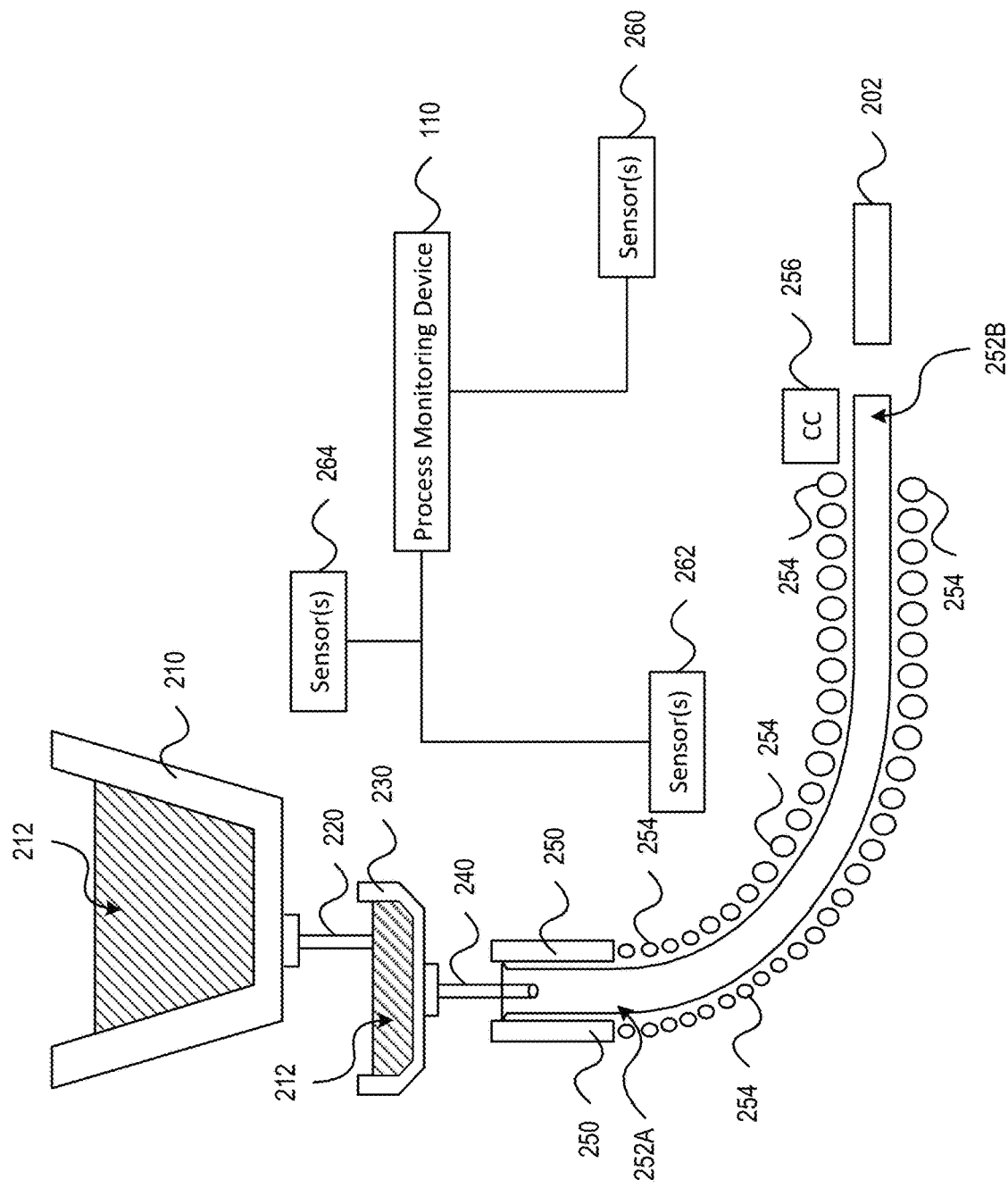
FIG. 2 is a block diagram illustrating a manufacturing infrastructure for providing a continuous casting process according to one or more aspects of the present disclosure.

As briefly described above, the process monitoring device 110 may monitor a process or system. For example, in FIG. 1 the process monitoring device 110 is shown as monitoring manufacturing infrastructure 150. A non-limiting and exemplary manufacturing infrastructure is shown in FIG. 2, which is a block diagram illustrating a manufacturing infrastructure for providing a continuous casting process. In the exemplary continuous casting process example of FIG. 2, the manufacturing infrastructure includes a ladle 210, a tundish 230, and a mold 250. Molten metal 212 may be provided to the ladle 210. An entry nozzle 220 may be provided to control the flow of the molten metal 212 to the tundish 230. The tundish 230 may be configured to hold enough molten metal 212 to allow the ladle 210 to be refilled or replaced prior to the molten metal 212 in the tundish 230 being emptied. It is noted that additives may be included in the molten metal 212 to change the properties of the metal produced via the casting process.

The molten metal 212 may exit the tundish 230 via entry nozzle 240 and enter the mold 250. The mold 250 may be cooled using a coolant (e.g., water, etc.) and may direct the molten metal 212 towards a plurality of rollers 254. As shown by arrow 252A, the plurality of rollers 254 may help guide the metal towards an exit of the mold, shown by arrow 252B. The metal may be slightly cooled due to heat loss as the metal passes through the rollers 254 such that the exterior surface of the metal is no longer molten but the interior may remain molten. After exiting the rollers 254, the metal may be cooled via a cooling chamber 256, which may be configured to cool the metal using water or another type of coolant or cooling technique. After cooling the metal one or more slabs, such as a slab 202, may be isolated or separated from the metal, which may facilitate transport of the slab 202 (e.g., to a location for further cooling or for other processing). It is noted that the slab 202 may be cooled to the point that it is solid, but may still be malleable and require further cooling.

At various points along the process, various sensors may be provided, such as sensors 260, 262, 264. The sensors may capture information about different portions of the continuous casting process and provide sensor data back to the process monitoring device 110. For example, the sensor(s) 260 may include infrared and/or visual (e.g., image and/or video) cameras that capture information about the slab 202; the sensor(s) 262 may capture information about the operational status of the rollers 254; and the sensor(s) 264 may provide information about the temperature of the molten metal 212 in the ladle 210 and/or the tundish 230, information about the ambient environment (e.g., ambient temperature, humidity, etc.) in which the continuous casting process is performed, or other types of information. The sensors 260, 262, 264 may include sensors disposed at various locations, such as to capture images of the outputs of the casting process as the metal exists the mold, after it is isolated or separated from the metal exiting the mold, or during storage/cooling of the slab 202.

Figure 3:
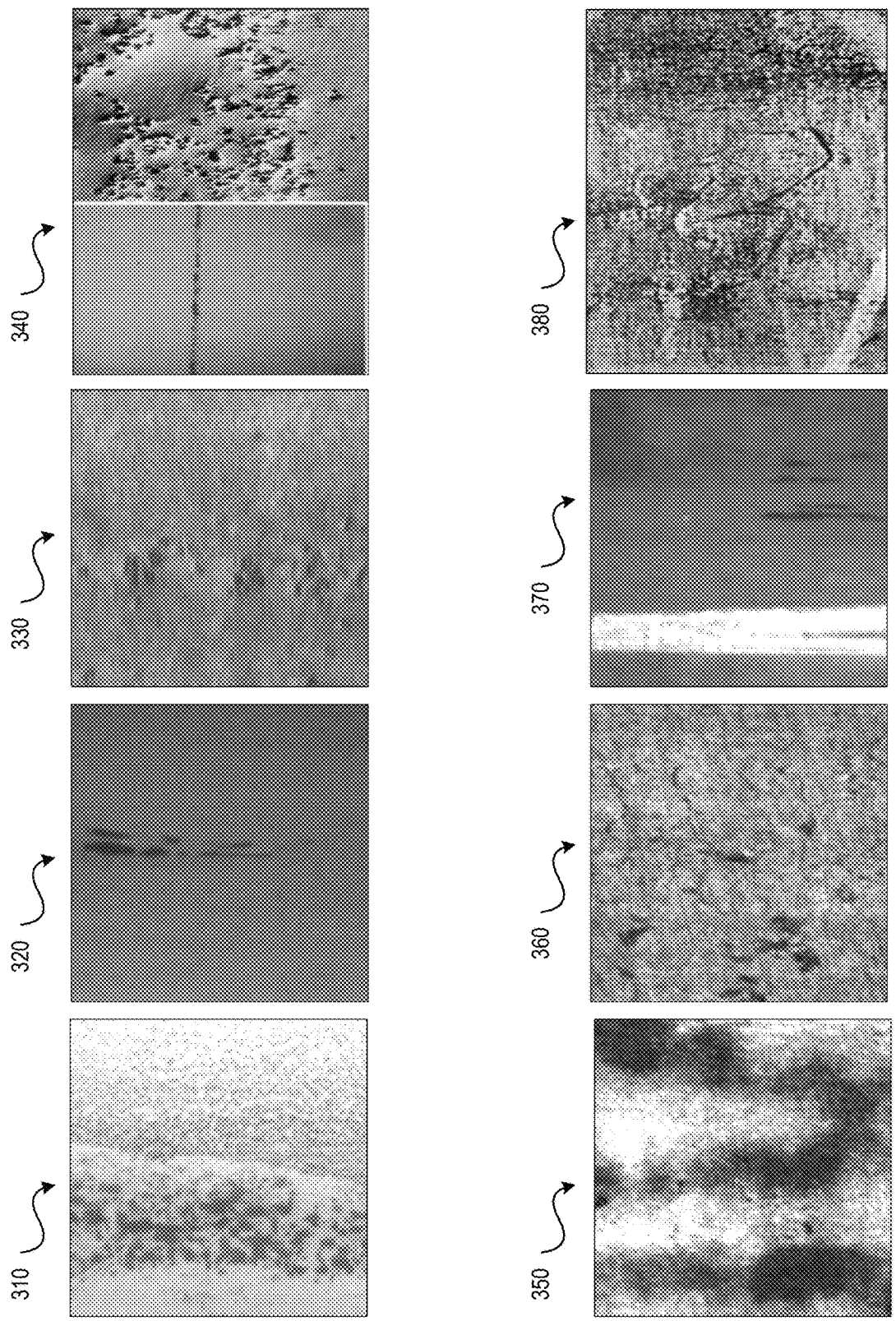
FIG. 3 shows images of different types of defects that may be identified according to aspects of the present disclosure.

The sensor data provided by the sensors 260, 262, 264 may be received and analyzed by the process monitoring device 110 to detect defects or other abnormalities that occur during the casting process. Referring briefly to FIG. 3, images illustrating exemplary defects that may occur during a casting process are shown. Image 310 shows a pitted defect, which may occur due to oxidation of the slab 202. Image 320 shows an inclusion defect. Inclusion defects may occur when a contaminant (e.g., slag, gases, undissolved alloys, etc.) is present when the molten metal 212 enters the mold 250. Image 330 shows a rolled in scale defect, which may occur when mill scale is present during cold rolling of the slab 202. Image 340 shows a sliver defect. A sliver defect may occur when a loose piece of metal is rolled onto the surface of the slab 202. Image 350 shows a patch defect that may occur when oxides are not cleaned from the surface of the slab 202. Image 360 shows a crazing defect, which is a series of cracks on the surface on the surface of the slab 202 or a rolled sheet formed from the slab 202. Image 370 shows a scratch defect (e.g., scratches on the surface of the slab 202 or a rolled sheet formed from the slab 202. Image 380 shows a scab defect, which may be caused by molten metal or another substance contacting the surface of the slab 202. Some of the above-described defects cannot be fixed, such as inclusion defects and sliver defects, and so the metal must be scrapped when these defects are present.

Referring back to FIG. 2, the sensors 260, 262, 264 may capture information associated with the casting process and provide the captured information to the process monitoring device 110. Once the data is received from the sensors 260, 262, 264, the process monitoring device may evaluate the sensor data using the defect detection/correction engine 140 to detect instances of defects or other abnormalities in the casting process, and then determine the cause(s) of the abnormalities. Once the abnormalities are detected and their causes identified, the process monitoring device 110 may provide control data to modify the casting process and mitigate further occurrences of the detected abnormalities, thereby improving the yield of the casting process and reducing the number of defects that are present in the slabs produced by the casting process. For example, the molten metal 212 may include metal and additives designed to improve characteristics of the metal (e.g., strengthen the steel, etc.) and the cause of the defect may be determined to be the quantities of additives used for the batch of molten metal being processed through the casting infrastructure. Upon determining that the cause of the defect is related to the additives used to produce the molten metal 212, control data including recommendations for modifying the additives (e.g., changing the quantities, changing the ratio of additives, etc.) may be provided to a user device (e.g., the user device 160 of FIG. 1). As an additional example, a temperature of the casting process (e.g., a temperature of the molten metal 212, an ambient temperature of the environment where the casting process is taking place, etc.) may be determined to be the cause of the defect and control data including information to control the temperature in a manner that mitigates the detected defect(s) or abnormalities may be provided to the user device. The control data provided to the user device may then be presented to a user and corrective actions may be taken (manually or automatically) to modify the casting process and minimize further occurrences of the detected defects. Correcting the casting processing in this manner may improve the quality of the product produced by the casting process (e.g., the quality of the slab 202), such as by mitigating the occurrences of the defects and abnormalities, which may produce a higher quality or stronger steel (or other material). It is noted that FIGS. 2 and 3 are described above with reference to a manufacturing infrastructure for casting molten metal for purposes of illustration, rather than by way of limitation and that embodiments of the present disclosure may be readily applied to other types of processes or systems.

Referring back to FIG. 1, during the monitoring the sensors 120 may provide sensor data 122 to the process monitoring device 110 via the one or more networks 170. It is noted that the sensors 120 may be integrated into the process monitoring device 110 or may be external to the process monitoring device 110 and communicatively coupled to the process monitoring device 110 via a wired connection (e.g., a serial connection, etc.) or a wireless connection (e.g., a peer-to-peer connection). As briefly described above, the sensor data 122 may include information associated with the performance of the manufacturing infrastructure 150 (e.g., the continuous casting infrastructure of FIG. 2) and the outputs of the manufacturing infrastructure 150 (e.g., the slab 202). The sensor data 122 captured during execution of the process may be provided to the defect detection/correction engine 140 for analysis. For example, the defect detection/correction engine 140 may include a model (or models) and a set of rules that have been trained and tuned by the training engine 130. The trained/tuned model(s) and set of rules may be used to evaluate the sensor data 122 to detect the presence of one or more defects or abnormalities associated with operations of the manufacturing infrastructure 150 and to determine causes of the defects and control data to mitigate further occurrences of the defects. As previously noted, the model(s) and the set of rules used by the defect detection/correction engine 140 to analyze the sensor data 122 may be trained and tuned via the training engine 130 prior to providing the trained and tuned model(s) and set of rules to the defect detection/correction engine 140. Exemplary aspects of the training engine 130 and the defect detection/correction engine 140 will now be described with reference to FIGS. 4-6.

Figure 4:
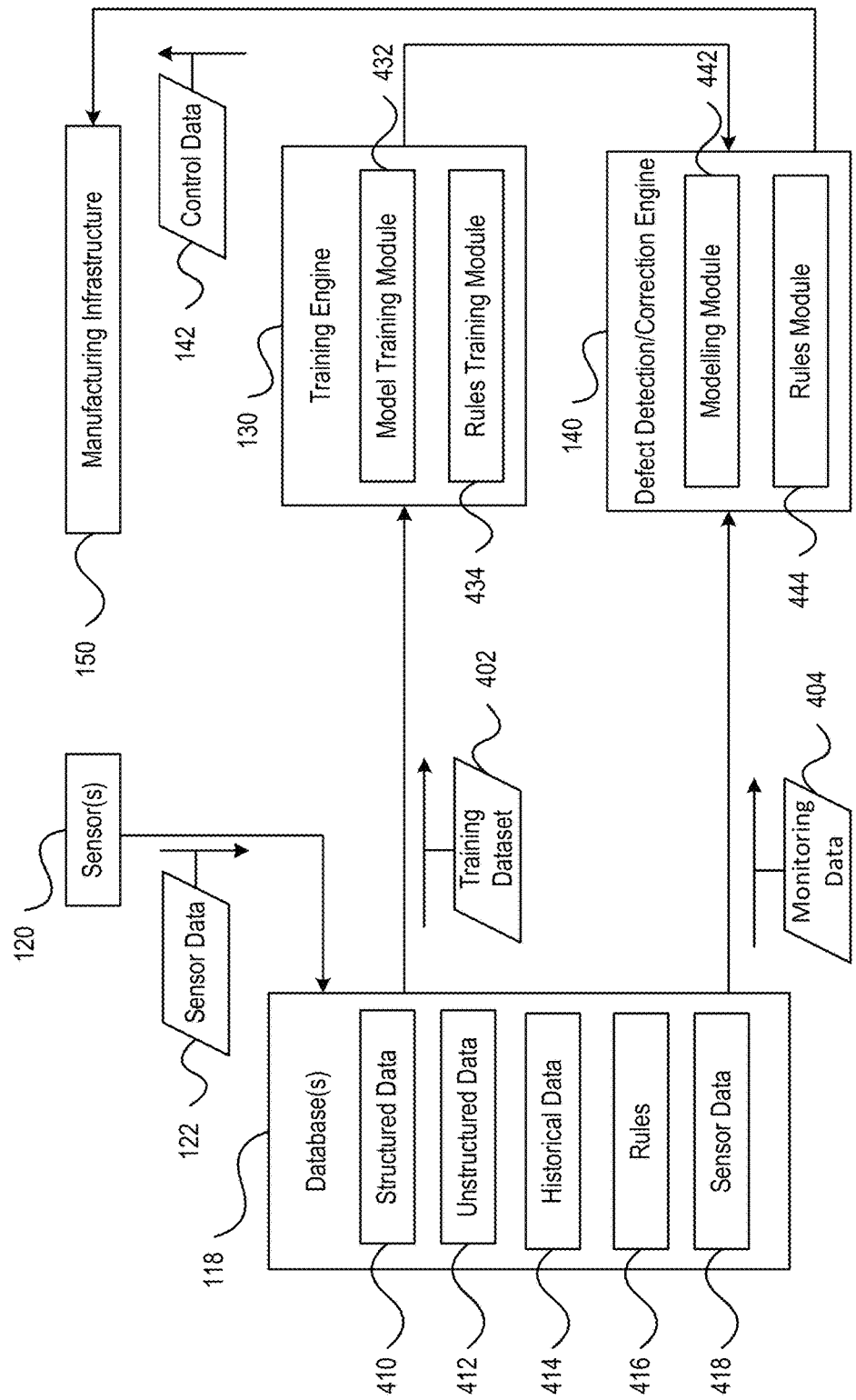
FIG. 4 is a block diagram illustrating additional aspects of monitoring a process according to aspects of the present disclosure.

As shown in FIG. 4, the sensor data 122 from the one or more sensors 120 may be received (e.g., by the process monitoring device 110 of FIG. 1) and stored at the one or more databases 118. For example, the information stored at the one or more databases 118 may include structured data 410, unstructured data 412, historical data 414, rules 416, and sensor data 418. It is noted that some types of data stored at the one or more databases 118 may be stored in separate databases, such as storing the rules 416 separate from other types of data, while other types of data may be stored in a single database, such as storing the sensor data 122 as part of the historical data 414 or storing the structured data 410 and the unstructured data 412 in a single database. In an aspect, at least a portion of the sensor data 122 may be maintained in a separate database (e.g., the sensor data database 418 and periodically rolled into the historical data 414 for use in training the model(s) and/or the rules. In some aspects, the historical data 414 may also include all or a portion of the structured data 410 and/or the unstructured data 412. It is noted that the various non-limiting examples for configuring the one or more databases 118 have been provided for purposes of illustration, rather than by way of limitation and that information may be recorded to databases or other data storage techniques suitable for use with the concepts disclosed herein.

As shown in FIG. 4, information from the one or more databases 118 may be used to generate a training dataset 402 and the training dataset 402 may be provided to the training engine 130. To facilitate training of the model(s), the training engine 130 may include a model training module 432. The model training module 432 may be configured to evaluate the training dataset 402 against one or more models and based on the training, output a tuned model (or tuned models) to the defect detect/correction engine 140, which may use the tuned model(s) to evaluate monitoring data 404 (e.g., data associated with the process captured during monitoring of the process) and identify defects or other abnormalities associated with the manufacturing infrastructure 150 (or another process or system). In addition to training the model(s), the training engine 130 may also be configured to train a set of rules using a rules training module 434. The rules training module 434 may be configured evaluate rules against the historical data 414, which may include a portion of the sensor data 418, and outputs generated during the training of the model(s) (e.g., defects and abnormalities) to identify rules that correctly associate a cause of defects and abnormalities or identify corrective actions that may be taken to mitigate further occurrences of the defects and abnormalities.

Figure 5A:
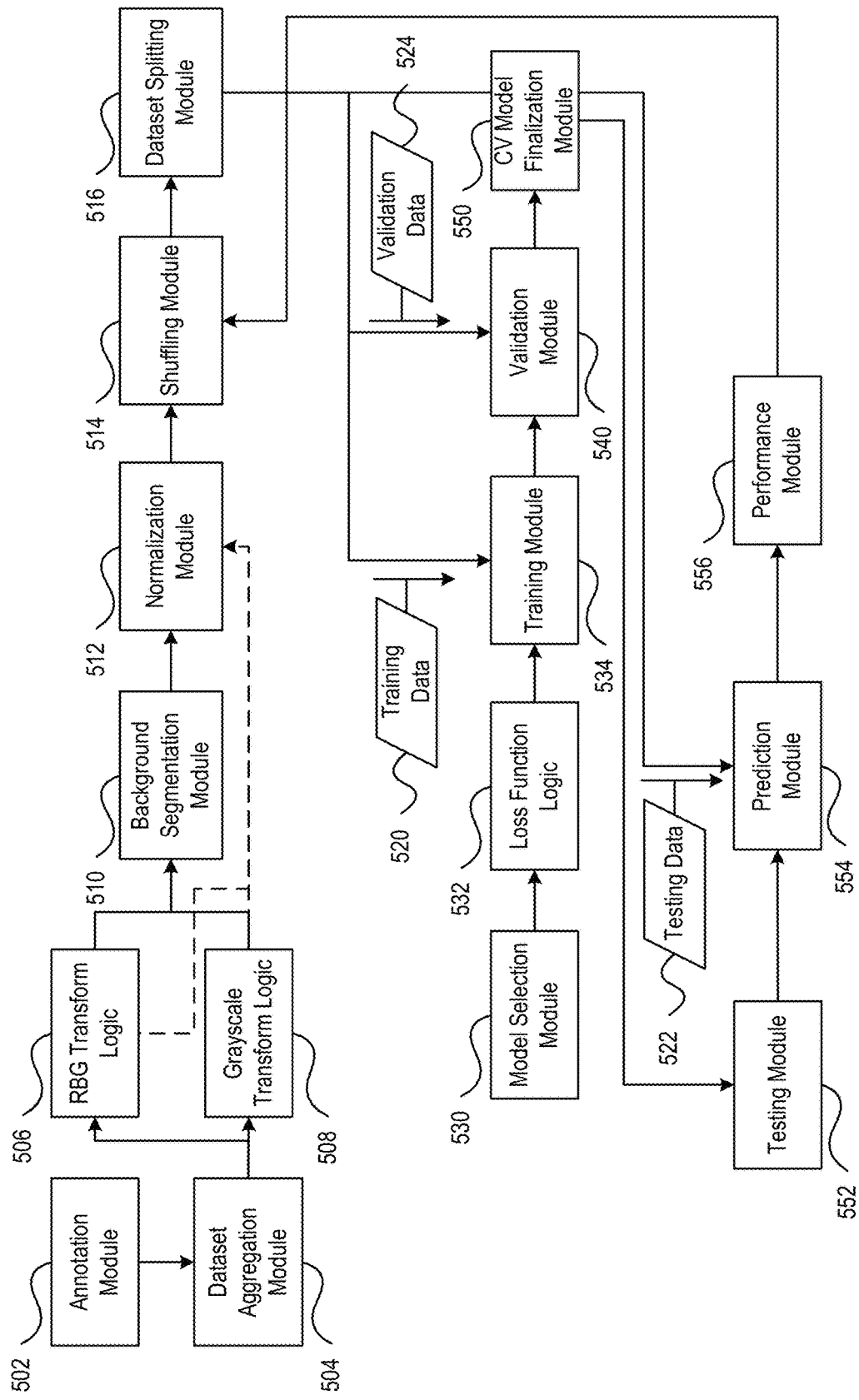
FIG. 5A is a block diagram illustrating exemplary aspects of training computer-vision models to identify abnormalities in a process or system in accordance with aspects of the present disclosure.

Referring to FIG. 5A, a block diagram illustrating exemplary aspects of training models to identify abnormalities in a process or system in accordance with aspects of the present disclosure is shown. As briefly described above with reference to FIG. 4, to facilitate the training of models by the training engine (e.g., the training engine 130 of FIGS. 1 and 4), a training dataset (e.g., the training dataset 402 of FIG. 4) may be provided to the training engine. Upon receiving the training dataset, the training engine may initiate operations to pre-process the training dataset in preparation for training, validating, and finalizing the model(s) for use in identifying abnormalities (e.g., via the defect detection/correction engine 140 of FIGS. 1 and 4). In an aspect, the training dataset may include media content, such as image content, video content, image content extracted from video content, and the like generated by one or more sensors (e.g., the one or more sensors 120 of FIGS. 1 and 4, the sensors 260, 262, 264 of FIG. 2).

The training engine may include an annotation module 502 configured to provide functionality for annotating at least a portion of the media content included in the training dataset. In an aspect, the annotation of the media content may configured to label at least some of the media content (e.g., images, portions of video content, etc.) for purposes of training a model. For example, different portions of the media content included in the training dataset may be associated with one or more defects (e.g., the defects described above with reference to FIG. 3) that may occur during the process or operation of a system (e.g., the manufacturing infrastructure 150 of FIGS. 1, 2, and 4) and labels associated with the one or more defects may be applied to the media content during the annotating. The applied labels may also include labels that indicate portions of the training dataset do not depict a defect, which may enable the models to be trained to identify non-defective outputs of the process or system. The labels may be used to train the model(s) to identify the different types of defects or abnormalities that may occur during the process or operation of the system, as well as to identify normal operations and outputs (i.e., operations where no defect has occurred in the outputs of the process or system).

A dataset aggregation module 504 of the training engine may be configured to compile a set of data for use in training a model based on the received training dataset. For example, the dataset aggregation module 504 may select portions of the training dataset for use in training the model, such as one or more (annotated and/or non-annotated) items of media content or other types of information. Once the set of data for use in training is compiled by the dataset aggregation module 504, the set of data may be provided to transformation logic, shown in FIG. 5A as including RGB transform logic 506 and grayscale transform logic 508. The RGB transform logic 506 may be configured to transform color information included in media content of the set of data produced by the aggregation module 504 into a format that can be ingested by the model(s) for purposes of training the models to identify different ones of the defects. To illustrate, the RGB transform logic 506 may be configured to extract information associated with the colors of pixels in the image and then generate a matrix or other data structure that represents the colors of the pixels in a numeric format. In an aspect, the color of a pixel may be represented by trio of numeric values (e.g., 122, 234, 56) corresponding to the contribution of each of the colors red, blue, and green (RBG), in combination, contribute to form the color of the pixel. In this manner, all pixels of an image may be represented as a matrix (or other data structure) that contains a trio of numeric values for each pixel and represents each pixel's RGB value. It is noted that while the RGB transform logic 506 is described as converting color information for each pixel into numeric values, other types of techniques may also be used. For example, hue, saturation, lightness (HSL), hue, saturation, brightness (HSB), and hue, saturation, value (HSV) may be used instead of RGB values to represent the color of each pixel. Extracting the color information from the media content may enable information from the media content to be injected into the model to allow the model(s) to be trained to identify defects and abnormalities based on color characteristics extracted from the media content (e.g., certain defects may be detectable based on the presence of certain color characteristics).

The grayscale transform logic 508 may be configured to extract information from the media content that may facilitate an additional method of training the model (e.g., a CV model) to identify defects based on media content associated with outputs of a process or system (e.g., media content depicting the slab 202 of FIG. 2). For example, the grayscale transform logic 508 may be configured to convert the color information of an image to a grayscale format, which may also be represented by numeric values (but may not require a trio of numeric values for each pixel). Extracting the grayscale information from the media content may enable additional types of information to be injected into the model, such as contrast information, which may enable the model(s) to be trained to identify defects and abnormalities based on contrast characteristics (e.g., certain defects may be detectable based on the presence of certain contrast characteristics), rather than based on color information.

In an aspect, once the color information and grayscale information are extracted by the RGB transform logic 506 and grayscale transform logic 508, respectively, the color and grayscale information may be provided to background segmentation module 510. The background segmentation module 510 may be configured to separate the image content (e.g., the color and grayscale information) into foreground and background portions. In an aspect, the color and grayscale information for each image included in the training data may be associated with timestamp and the background segmentation module 510 may be configured to identify the background and foreground portions of the image content based on differences between multiple timestamped images, where it may be assumed that the foreground remains static and the background may be identified based on changes in the image. For example, when the slab 202 of FIG. 2 is removed from the manufacturing infrastructure it may be moved to a storage area where it may be cooled over time. Different images of the slab 202 may be taken at the point where the slab is first cut and where it is being stored, creating different backgrounds that may be used to detect the foreground (e.g., the slab 202) and the background. Alternatively, changes in the foreground may be used to detect the foreground and the background. For example, as the slab 202 cools it may change in color, thereby allowing the differences in color to be identified as the foreground and then detecting the remaining portion of the image as the background. In some aspects, the contrast information may also be used, such as to use contrast information to identify shapes and then segment the foreground and background portions based at least in part on the shapes. Utilizing the contrast information may help prevent portions of the foreground from accidentally being lumped in the with the background or vice-versa. It is noted that the exemplary techniques for performing background and foreground segmentation have been described above for purposes of illustration, rather than by way of limitation and that other techniques may also be used by the background segmentation module 510. Moreover, it is noted that the background segmentation module 510 may be optional and that some embodiments of the present disclosure may operate without using the background segmentation module 510.

After processing by the background segmentation module 510 (or after processing by the RGB transform logic 506 and the grayscale transform logic 508 when segmentation is not performed), a normalization module 512 may be configured to normalize the color and grayscale information. In an aspect, the normalization module 512 may normalize the color and grayscale information by consolidating portions of the color information and the grayscale information. For example, groups of pixels (e.g., 8 pixels by 8 pixels) may be combined and the average values from the color information or the grayscale information may be used to represent the group of pixels, thereby creating a smaller and more compact representation of the color information and the grayscale information. In an additional or alternative aspect, normalization may include spatial normalization to ensure that information depicted in multiple images appear consistently across all images. For example, suppose that one image of the slab 202 of FIG. 2 was taken from 10 feet away and another image of the slab 202 was taken from a greater or shorter distance. In such instances, the slab 202 may be a different size in each of the images captured at the different distances, but the spatial normalization may be used to ensure that the slab 202 is approximately the same size in each image. Spatial normalization may include scaling the image(s) (e.g., to make sure relevant content depicted in the images (e.g., the slab 202) appear to be approximately the same) and rotating the image(s) (e.g., to ensure that the relevant content depicted in the images is oriented in the same manner in each of the images). In another additional or alternative aspect, the normalization may include intensity normalization, whereby the values represented in the data structure may be modified to fit within a same statistical range. Intensity normalization may be helpful when images are captured under different lighting conditions, which may cause the images to appear to depict different content despite that not being the case. It is noted that the exemplary types of normalization described above have been provided for purposes of illustration, rather than by way of limitation and that the normalization module 512 may utilize any of the above-described techniques, alone or in combination with or other image normalization techniques, in accordance with the concepts described herein, to normalize the images used for training a model. Normalizing the images of the set of data to be used for training the model(s) may ensure that the model is trained on data that depicts similar content (e.g., defects, abnormalities, and normal cases) in a consistent manner, which may improve the quality of the trained models (e.g., improve accuracy, increase learning rates, and the like).

Following normalization, the normalized images may be provided to a shuffling module 514. The shuffling module 514 may be configured select and order the normalized images for use in a training cycle. It is noted that the training of the models may include multiple cycles and the shuffling module 514 may be configured to select a different set of normalized images and/or arrange the images in a different order for each cycle. It is also noted that while different sets of images may be selected for each cycle, the image sets used in consecutive cycles may include some of the same images and some of the images may be arranged in the same order—however, the set of images for each cycle may include at least some images that were not used in a previous cycle and/or at least some images that are arranged in a different order than the previous cycle.

Once the set of normalized image is created by the shuffling module 514, the set of selected images may be provided to a dataset splitting module 516. The dataset splitting module 516 may be configured to divide (or split) the set of normalized images into different subsets of images. For example, the set of normalized images may be divided into a set of training data 520, a set of testing data 522, and a set of validation data 524. During the training, a model selection module 530 may obtain a model and configure the model for training. For example, if the model includes a neural network, the model selection module 530 may be configured to define the network of the model. It is noted that while a neural network is described as one example of a model that may be used by embodiments of the present disclosure, in some embodiments other types of models may be used. Once the model is selected, loss function logic 532 may configure a loss function for the model. The loss function may include log loss, cross entropy, focal loss, F1 score, Tversky loss, Hausdorff distance, or another type of loss function. In an aspect, the CV model may account for various features detectable within the outputs of the monitored process or system. Nevertheless, it is to be understood that the concepts disclosed herein may be readily adapted to the features of other processes and systems to enable embodiments of the present disclosure to monitor processes and systems other than the specific and non-limiting process and system examples disclosed herein.

With the model selected and the loss function configured, a training cycle may be commenced by a training module 534. As shown in FIG. 5A, the training module 534 may be configured to receive the training data 520 output by the dataset splitting module 516 and then evaluate the training data 520 against the model selected and configured by the model selection module 530. During the training each of the images of the training data 520 may be evaluated against the model and classified as depicting a defect or not including a defect. In an aspect, the images included in the training data 520 may include tags (e.g., tags created via the annotation module 502) that indicate whether the image depicts a defect or not and the model may use the tags to learn characteristics of the images that do and do not depict defects. It is noted that a variety of algorithms or classifiers may be tested for the CV model(s). For example, the algorithm used by the model(s) during training may include various architectures of neural networks. It is noted that while specific algorithms have been described, such description has been provided for purposes of illustration, rather than by way of limitation and that models may be configured to use other types of algorithms or classifiers in some aspects. Once the training is completed, the trained model may be validated via a validation module 540. The validation module 540 may be configured to evaluate the images of the trained model against the validation data 524. The validation process may be used to determine the features of the trained model that require tuning. Once the trained model is evaluated against the validation data 524, the model may be finalized. For example, a model finalization module 550 may provide functionality for configuring hyper parameters of the model.

Once the hyper parameters of the model are tuned, the finalized model may be subjected to further evaluation via a testing module 552. The testing module 552 may configured to evaluate the images of the testing data 522 and classify the images as depicting a defect or normal content. Once the evaluation of the images by the testing module 552 is complete, predictions may be made via a prediction module 554. The predictions may indicate whether it is believed that a particular image of the testing data 522 will be identified (or classified) by the finalized model as depicting a defect or not. In an aspect, a confusion matrix may be constructed to evaluate the number of true positive (TP) events (e.g., correctly identified defects), true negative (TN) events (e.g., correctly identified no defect), false positive (FP) events (e.g., incorrectly identified defects), and false negative (e.g., incorrectly identified no defect) based on the classifications output by the model during evaluation of the testing data 522.

A performance module 556 may be provided to evaluate the performance of the finalized model based on the predictions and the outputs of the testing module 552. For example, the performance may be evaluated based on the number of correct classifications produced by the model (e.g., the number of correctly predicted TP and TN events). If the performance satisfies a threshold performance level (e.g., 70% correct, 80% correct, 85% correct, 90% correct, etc.), the model may be provided to a defect detection/correction engine (e.g., the defect detection/correction engine of FIGS. 1 and 4) for use in evaluating a monitored process or system, as described in more detail below with reference to FIG. 6. If the model does not satisfy the threshold performance level, the dataset may be shuffled by the shuffling module 514 and a new testing cycle may commence. Testing cycles may be repeatedly performed until the finalized model satisfies the threshold performance level or until the model is determined to not be capable of satisfying the threshold performance level. In the latter case, a new model may be selected, tested, validated, and finalized (e.g., tuned), subjected to the above-described testing and prediction/performance evaluation processes to determine whether the newly configured model provides the threshold level of performance. This cycle may repeat until a model providing the threshold performance level is achieved or it is determined that no model can achieve the threshold performance level, at which point the model providing the best performance may be selected. It is noted that while it may be possible that a model cannot be selected that provides the threshold level of performance, over time the ability to identify models that satisfy the threshold performance levels may be achieved as more training data is collected, which may provide for more robust learning by the models during operations of the training module 534. Thus, while the accuracy of a newly deployed system implementing techniques of the present disclosure may initially be below acceptable or desired levels, the ability to train the models over time may enable the system to become more accurate through additional training and eventually reach desired performance and accuracy levels. The models used to identify the defects may be selected from a variety of model architectures, such as one of the following architectures: U-net, region-based convolutional neural network (R-CNN), mask R-CNN, full convolutional neural network (FCN), SegNet, Poly-YOLO, PSPNet, and the like. It is noted that while certain model architectures have been described herein, such description has been provided for purposes of illustration, rather than by way of limitation and other model architectures may be utilized by models in accordance with the concepts disclosed herein.

Figure 5B:
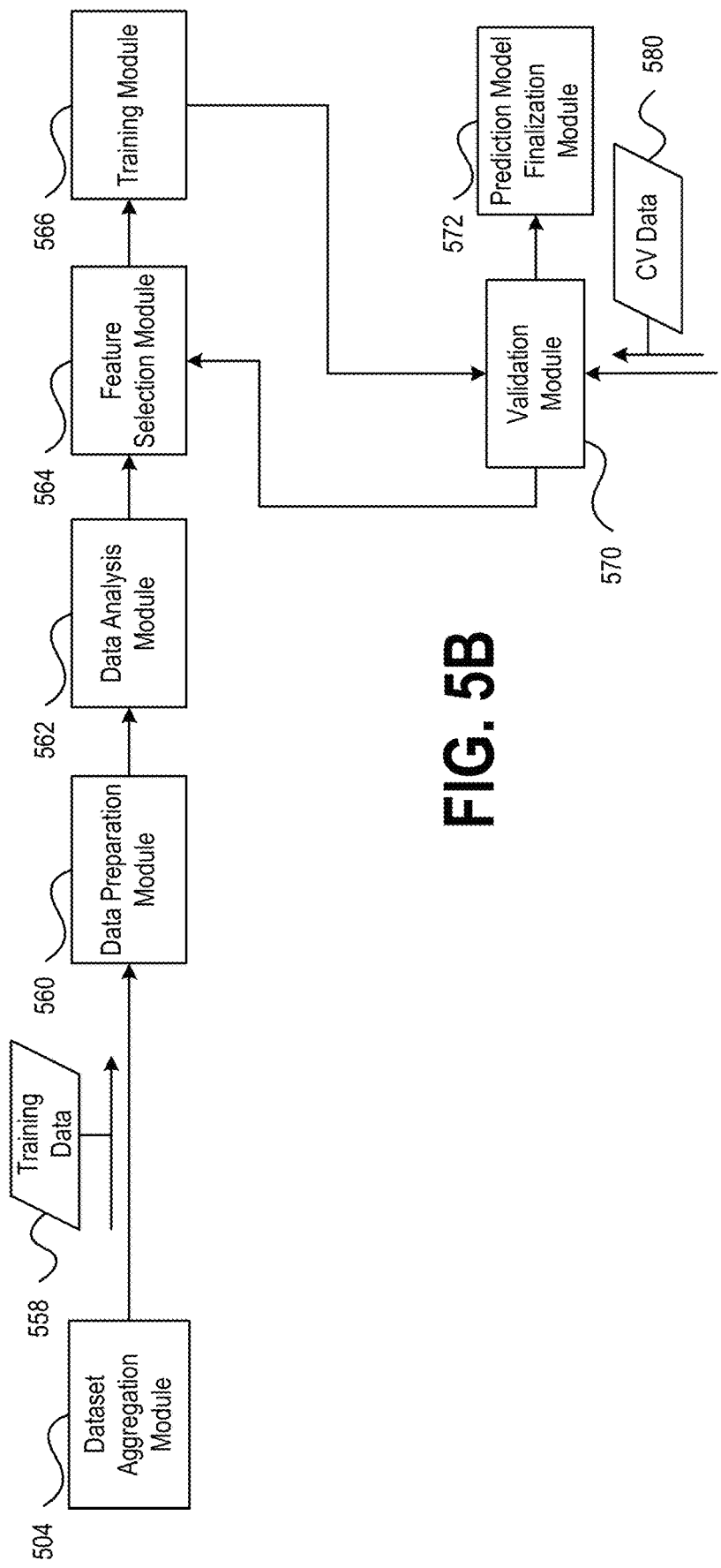
FIG. 5B is a block diagram illustrating exemplary aspects of training prediction models to identify abnormalities in a process or system in accordance with aspects of the present disclosure.

Referring to FIG. 5B, a block diagram illustrating aspects of training a machine learning model for predicting defects is shown. It is noted that while FIG. 5A illustrates training of a CV-based machine learning model to detect defects that occur in outputs of a process or system, such as the manufacturing infrastructure 150 of FIGS. 1 and 2, the machine learning models trained via the techniques described with reference to FIG. 5B may be prediction models, which may be used to predict the types of defects expected to occur during execution of a process or system. As shown in FIG. 5B, the data aggregation module 504 may provide a set of training data 558 to a data preparation module 560. It is noted that unlike the training data used to produce or obtain the CV models in FIG. 5A, which include unstructured data (e.g., media content) provided by the dataset aggregation module 504, the set of training data 558 may include structured data (e.g., lab reports, materials reports associated with the raw materials used in the process) and historical data (e.g., temperature data, cooling parameter data, flow rate data, etc.). Exemplary types of data that may be within the set of training data 558 include: air pressure, casting metal, surface temperature at spray exit, surface temperature at mold exit, casting speed, mold level, stopper position, air flow rate, mold velocity, mold stroke length, mold frequency, surface temperature, mold thickness, cooling water velocity, cooling water temperature, and solidus temperature. It is noted that the exemplary types of data included in the set of training data 558 described above have been provided for purposes of illustration, rather than by way of limitation and prediction models obtained or produced for different types of monitored processes and systems may utilize different types of data to perform training in accordance with the concepts disclosed herein.

The data preparation module 560 may be configured to analyze the data and perform various processes to prepare the training data 558 for use with the prediction model, such as to normalize values or other types of operations to create a dataset that is suitable for analysis by the machine learning prediction model. The outputs of the data preparation module 560 may be provided to a data analysis module 562, which may be configured to analyze the data to determine various features that are detectable by the prediction model. A feature selection module 564 may be configured to select a set of features based on the outputs of the data analysis module 562, where the selected set of features may enable the prediction model to predict the occurrence of defects. For example, a prediction model used to predict defects that may occur during operation of the manufacturing infrastructure of FIG. 2 may account for a set of features that include all or some of the following features of a continuous casting process: air pressure, casting metal, surface temperature at spray exit, surface temperature at mold exit, casting speed, mold level, stopper position, air flow rate, mold velocity, mold stroke length, mold frequency, surface temperature, mold thickness, cooling water velocity, cooling water temperature, and solidus temperature. It is noted that the exemplary features have been described above for purposes of illustration, rather than by way of limitation and the different types of monitored processes and systems may have different features than those described above. The set of features selected by the feature selection module 564 may then be applied to the prediction model and the prediction model may be trained using a training module 566. It is noted that a variety of algorithms or classifiers may be tested and evaluated for the prediction model(s). For example, the algorithm used by the model(s) during training may include various architectures of neural networks, random forest, GBM, Xgboost, ensemble modeling, neural network, CatBoost, or other types of algorithms.

During the training a portion of the set of training data 558 may be used to train the model to predict defects that may occur during an execution of the process or system to be monitored. For example, the model may be configured to evaluate the inputs to the process or system (e.g., raw materials, etc.) and run-time parameters associated with the process or system (e.g., temperature parameters, cooling parameters, ambient environment parameters, control parameters, and the like) to predict one or more defects expected to occur if the process or system is executed using the inputs and the run-time parameters. Outputs derived from the training of the prediction model may be provided to a validation module 570, which may be configured to validate the predictions (e.g., determine whether the predictions are accurate).

In an aspect, the validation module 570 may be configured to perform validation of the outputs of the prediction model based in part on outputs determined by a CV model. For example, CV data 580 may be provided to the validation module 570 for use in validating the predictions. In an aspect, the CV data 580 may be historical CV data determined from prior evaluations of the process or system using the CV models obtained via the operations described with reference to FIG. 5A. It is noted that the prediction model training may be synchronized to the CV data 580 such that CV data corresponding to a particular previous execution of the process or system is used to validate predictions of defects by the prediction model using the input parameters and run-time parameters corresponding to the previous execution of the process or system. To illustrate, the process or system may have undergone several execution cycles (ECs), $EC_1$, $EC_2$, ..., $EC_n$ and each EC may have been performed using a set of input parameters (IPs), $IP_1$, $IP_2$, ..., $IP_n$, and a set of run-time parameters (RPs), $RP_1$, $RP_2$, ..., $RP_n$, where $EC_x$ is an execution cycle configured with parameters $IP_x$ and $RT_x$. During validation based on the CV data 580, predictions determined by the prediction model during training may be based on the IPs and RTs for each EC and those predictions may be validated against outputs of the CV model derived from a corresponding one of the ECs, such that CV data derived from actual execution of $EC_1$ are used to validate predictions by the prediction model determined based on $IP_1$ and $RP_1$. To illustrate, suppose that the CV data 580 indicates that $EC_1$ produced a first type of defect and the training of the prediction model by the training module 566 predicted a second type of defect would occur during $EC_1$. The validation module 570 may determine that the prediction model is invalid and the training process may revert back to the feature selection module 564 for feature selection or other tuning operations. Once the model is tuned, additional training may be performed and the validation may be evaluated again. If the newly tuned and trained prediction model predicted the first type of defect would occur during $EC_1$ the prediction model may be determined to be valid, at least for the first type of defect. It is noted that validation may indicate the prediction model performs to a satisfactory level with respect to some but not all types of defects. In such instances additional tuning and training may be performed to improve the prediction model with respect to the defects for which the prediction model does not perform satisfactorily. Thus, it is to be understood that the tuning and refinement of the prediction model may be performed on a defect-by-defect basis and over time the prediction model may be trained to accurately predict different types of defects that may occur.

Once the prediction model is validated it may be provided to a finalization module 572. The finalization module 572 may be configured to output the model for use during monitoring of a live process or system. To illustrate, the finalization module 572 may provide the validated prediction model to the modelling module 442 of FIG. 4. Once deployed to the modelling module 442, the prediction model may be utilized to analyze parameters of a process or system and predict defects expected to occur during an execution cycle of that process or system.

Referring back to FIG. 4, the rule training module 434 may provide functionality configured to facilitate creation, modification, and deployment of rule sets configured to identify causes of defects and abnormalities identified with respect to a process or system. To illustrate, in the example embodiment of FIG. 2 the set of rules may be used to detect that a defect in the slab 202 was caused by a temperature of the molten metal 212 (e.g., too hot, too cold, etc.) when poured into the ladle 210 or the tundish 230 or that a defect was caused by one or more additives or the quantities of the one or more additives included in the molten metal 212. The set of rules may also be configured to provide recommendations to correct the defects or abnormalities, such as to recommend a new temperature for providing the molten metal 212 to the ladle 210 or tundish 230 or suggesting modifications to the additives or quantities of additives used to produce the molten metal 212.

In an aspect, the rules may be configured or generated via a graphical user interface provided by the training engine 130 (or the rule training module 434). The training engine 130 (or the rule training module 434) may present the graphical user interface to a user (e.g., a user of the user device(s) 160 of FIG. 1), and the graphical user interface may provide tools for the user to create, modify, and test various rules. In an aspect, the rules may be generated based on information included in the training data 402. For example, the historical data 414 (e.g., historical sensor data, historical process input parameters, historical process control parameters, etc.) and the structured data 412 (e.g., lab reports or other types of information corresponding to an output of the monitored process or system). The lab reports and other types of information may be used to perform a root cause analysis (RCA) of a defect or abnormality occurring within the output of the process. To illustrate, it may be determined, based on the lab reports and other types of information, that a certain combination of input parameters (e.g., additives or quantities of those additives produces outputs containing a particular defect while other combinations of those same additives (or different additives) in different quantities) do or do not result in the defect. Additionally, it may be determined that performing the process under different control parameters (e.g., different cooling parameters, such as flow rate or temperature, different mold speeds, and the like) produces outputs that do or do not contain the particular defect. The relationship between the defect and the cause of the defect may be configured as a rule (e.g., an if-then statement, etc.) that may be added to the set of rules 416.

Figure 5C:
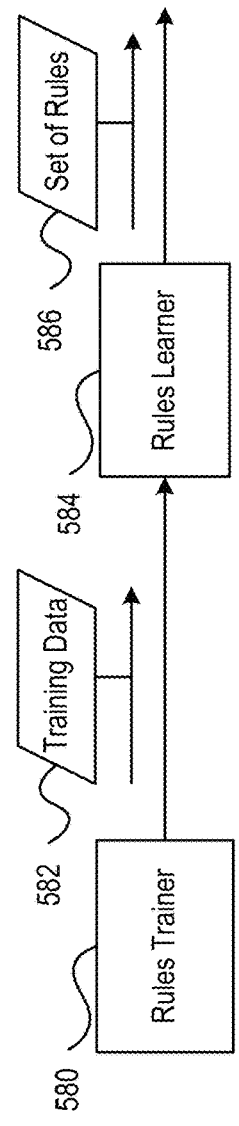
FIG. 5C is a block diagram illustrating exemplary aspects of training rules for determining causation of defects and modifications to mitigate defects in outputs of a process or system in accordance with aspects of the present disclosure.

Referring briefly to FIG. 5C, a block diagram illustrating an exemplary process for creating rules in accordance with aspects of the present disclosure is shown. As shown in FIG. 5C, a set of rules 586 may be obtained (e.g., by the rules training module 434 of FIG. 4) via a rules trainer 580 and a rules learner 584. The rules trainer 580 may be configured to generate a training dataset 582 that may be used to train the rules. For example, the rules trainer 580 may compile information from the historical data (e.g., historical input parameters, historical process control parameters, etc.) and the structured data (e.g., lab reports, etc.) to form the training data 582. The information included in the set of training data 582 compiled by the rules trainer 580 may include time stamped data, which may allow different portions of the training data to be associated with particular executions of the process or system to allow the rules to be trained on defects that occur (or the absence of defects) during those particular executions of the process or system. In an aspect, a user may utilize a graphical user interface (e.g., the graphical user interface provided by the training engine 130) to view, modify, and add to the training data 582. For example, the user may view the training data via the graphical user interface and utilize the tools provided by the interface to create some proposed rules (e.g., causation rules), which may be added to the training dataset 582.

The set of training data 582 generated by the rules trainer 580 may be provided to the rules learner 584. The rules learner 584 may evaluate the proposed rules against the training data (e.g., the historical data, the lab reports, etc.) to analyze and validate the rules. During analysis and validation of the rules the rules learner 584 take different types of input data into consideration, such as the historical data, the structured data, and the outputs of one or more models produced by a modelling engine (e.g., the CV model and/or the prediction model obtained or generated by the modelling training module 432 of FIG. 4). As a non-limiting example, the rules trainer 584 may use the model outputs to validate one or more rules, such as to determine whether a causation rule correctly identifies a cause of a defect or abnormality or to evaluate whether a process or control rule to control input or control parameters of the process or system mitigate a particular defect or abnormality. Based on the operations of the rules learner 584, one or more modifications may also be made to the rules. To illustrate, a proposed rule may suggest that a temperature parameter be configured to a particular value (e.g., 1,500° F.) when certain operational and/or input parameters are configured. The rules learner 584 may analyze the training data 582, the model outputs, or both and determine whether to modify the particular value for proposed rule to a different value (e.g., from 1,500° F. to 1,555° F.). For example, the lab reports and other information included in the training data 582 may indicate that the value should be modified (or not). If the model outputs (e.g., CV model outputs, prediction model outputs, or both) indicate that no defect was present with the modified value the rules learner 584 may adjust the value of the particular rule, and where the model outputs indicate a defect was present with the modified value the rules learner 584 may not adjust the value of the particular rule.

When the rules learner 584 determines to modify a rule, the modified rule may then be validated based on model outputs, such as to determine whether any model outputs generated based on the modified value or the current value include a defect. It is noted that while the exemplary rule modification and validation process described in the example above relates to validation/modification of control parameters (e.g., temperature parameters), the rules learner 584 may also perform similar operations with respect to rules related to input parameters and RCA rules (i.e., causation rules). For example, a proposed causation rule may indicate that a defect is caused by a particular aspect of the process, such as an input parameter(s), a control parameter(s), or a combination of input and control parameters. The rules learner 584 may then evaluate the rule based on the training data 582 and perform validation of the rule using model output data as described above. Once operations of the rules learner 584 are complete, a set of rules 586 may be produced. The set of rules 586 may include rules that reduce the likelihood of a defect or abnormality and that may enable real-time modifications (e.g., while the process is executing) to be made to the process or system to mitigate further instances of any defects that may occur, as described in more detail below.

Referring back to FIG. 4, the rules generated by the rules training module 434 may include causation rules configured to predict or identify the cause of the defect based on characteristics of the defect, characteristics determined from the structured data 410 included in the training data (e.g., the lab reports, temperature data, additives included in the molten metal 212, etc.), or other types of information. The generated rules may then be evaluated and validated to determine which rules correctly identify causes of identified defects. The rules may be evaluated against the outputs of the trained model to validate causes of defects or abnormalities identified by the trained model and then the predicted causes may then be verified based on comparing the cause predictions to the lab reports, a portion of the structured 410, the historical data 414, and the like. Rules that correctly identify causes of predicted faults may be added to a set of rules 416 (e.g., the set of rules 586 of FIG. 5C) and rules that incorrectly identify causes of predicted faults may be revised or discarded and replaced with new rules.

As described above with reference to FIG. 5C, the rules training module 434 may be configured to generate and train rule sets. The graphical user interface provided by the rules training module 434 may provide tools to allow the user to create, modify, and test various rules related to actions that may be taken to mitigate further occurrences of the identified defects. In an aspect, the rules may be generated based on information included in the training data 402 (or the training data 582 of FIG. 5C). For example, the historical data 414 and the structured data 410 may include information associated with lab reports or other types of information corresponding to an output of the monitored process or system (e.g., analysis of a slab similar to the slab 202 of FIG. 2), as well as information associated with the inputs that contributed to the output of the monitored process or system (e.g., additives used to create the molten metal 212 used to form the slab, temperature information, mold speed, cooling water flow rates, and the like). The lab reports and other types of information may be used to determine a remedy for the defect or abnormality. To illustrate, it may be determined that a certain combination of additives or quantities of those additives produces outputs containing a particular defect while other combinations of those same additives (or different additives) in different quantities do not result in the defect.

Additionally, it may be determined that performing the process under different conditions (e.g., different cooling parameters, such as flow rate or temperature), different mold speeds, and the like may produce outputs that do not contain the particular defect. Depending upon the determined cause of the defect, a rule may be configured to modify the process or system. For example, where the defect is related to process or system parameters (e.g., cooling parameters, temperature parameters, a rate at which molten metal is introduced to the mold, mold speed, etc.), a rule may be created to propose a change to the parameters of the process or system (e.g., adjust cooling parameters, temperature parameters, etc.), such as to use process parameters determined from the lab reports or other information as producing process or system outputs that do not contain a particular defect. If the defect is related to material parameters (e.g., additives used, quantities of each additive, etc.), a rule may be created to modify the material parameters (e.g., change the additives used, change the quantities of one or more additives, and the like), such as to use material parameters determined from the lab reports or other information as producing process or system outputs that do not contain a particular defect.

In an aspect, the causation rules may be used, at least in part, as inputs to the process control rules, which may be used to adjust and control input parameters (e.g., materials or other inputs to the process) and control parameters (e.g., configuration parameters for execution of the process) in a manner that reduces or mitigates occurrences of defects. For example, a causation rule may specify that a particular combination of materials is the cause of a defect. An output of that causation rule may be provided as an input to one or more of the process and material control rules, such as a rule that is configured to remedy the defect by modifying the combination of materials.

As described above, once the set of process and material (or quality) control rules is created, the set of process and material control rules may be evaluated and validated by the rules training module 434 (e.g., by the rules learner 584 of FIG. 5C). To illustrate, the rules training module 434 may be configured to evaluate causes of defects (e.g., the defects determined by the set of causation rules (described above) based the outputs of the model generated by the model training module 432) and determine actions to mitigate further occurrences of those defects. The process and material control rules may be evaluated and validated to determine which rules correctly identify actions to mitigate occurrences of defects. For example, the material and process control rules may be evaluated against the lab reports and other information to determine whether the rules correctly identify actions to mitigate occurrences of particular defects. Material and process control rules that are determined to be accurate during the validation may be added to the set of rules 416 and material and process control rules that are determined to identify actions that are not likely to mitigate the causes of defects may be revised or discarded and replaced with new rules.

It is noted that while the exemplary processes for creating rules are described above as involving an at least semi-manual process whereby a user creates rules using tools provided by a graphical user interface, in some aspects the rules 416 may be generated automatically. For example, the lab reports and other information may be parsed by the rules training module 434 to identify keywords associated with material/process parameters as well as information indicating the presence of defects or lack of defects. When keywords associated with a defect are detected, the rules training module 434 may be configured to identify material/process control parameters used to produce the output that included the defect. Similarly, the rules training module 434 may identify non-defective outputs and the material/process control parameters used to produce those outputs. Similarities and differences may be determined based on the information associated with the defective and non-defective outputs and then used by the rules training module 434 to generate rules. To illustrate, lab reports and other information may include data associated with creation of slabs having defects and slabs that do not have defects. Information regarding the material and process control parameters of those difference slabs may be analyzed to identify differences in the material and process control parameters for the slabs that did and did not have defects and then that information may be used to automatically create rules configured to suggest actions to modify the material and/or the process control parameters to mitigate occurrences of the defects.

Once training and creation of the rules (e.g., the causation rules and the material and process control rules) is complete, the set of rules 416 may be provided to the defect detection/correction engine 140 for use in identifying causes of identified defects and actions to mitigate further occurrences of identified defects during live monitoring of the process or system (e.g., the manufacturing infrastructure 150 of FIGS. 1, 2, and 4) by the process monitoring device (e.g., the process monitoring device 110 of FIG. 1). Exemplary aspects of utilizing a rule set to mitigate and identify defects during live monitoring are described in more detail below.

Once training of the model(s) and the rules is complete, the model(s) and the set of rules 416 may be provided to the defect detection/correction engine 140. As shown in FIG. 4, the defect detection/correction engine 140 may include a modelling module 442 and a rules module 444. The model(s) produced by the model training module 432 may be provided to the modelling module 442 for use in evaluating the performance of the process or system and to identify defects in outputs of the process or system, such as a defect in the slab 202 of the manufacturing infrastructure 150. Similarly, the set of rules 416 produced by the rules training module 434 may be provided to the rules module 444 for use in identifying causes of defects detected by the modelling engine 442 (e.g., based on the causation rules of the set of rules 416) and for recommending actions to mitigate future occurrences of those defects (e.g., based on the materials and process control rules of the set of rules 416). As illustrated in FIG. 4, while the training engine 130 may be provided with training dataset 402 for use in creating the set of rules 416 and the model(s), the defect detection/correction engine 140 may be provided with monitoring data 404. The monitoring data 404 may correspond to sensor data 122 received in real-time or near-real-time (e.g., within a few seconds) from the sensor(s) 120. The sensor data 122 may include media content (e.g., images and/or video of portions of the process or system, such as the slab 202 of FIG. 2), process control data (e.g., cooling parameters, flow rate parameters, temperature information, and the like) of the manufacturing infrastructure 150, or other types of information. The monitoring data 404 may also include information associated with various other aspects of the monitored process or system. For example, the monitoring data 404 may include information associated with materials parameters used to produce the molten metal 212 of FIG. 2 that is provided to the manufacturing infrastructure 150 to produce the slab 202.

Figure 6:
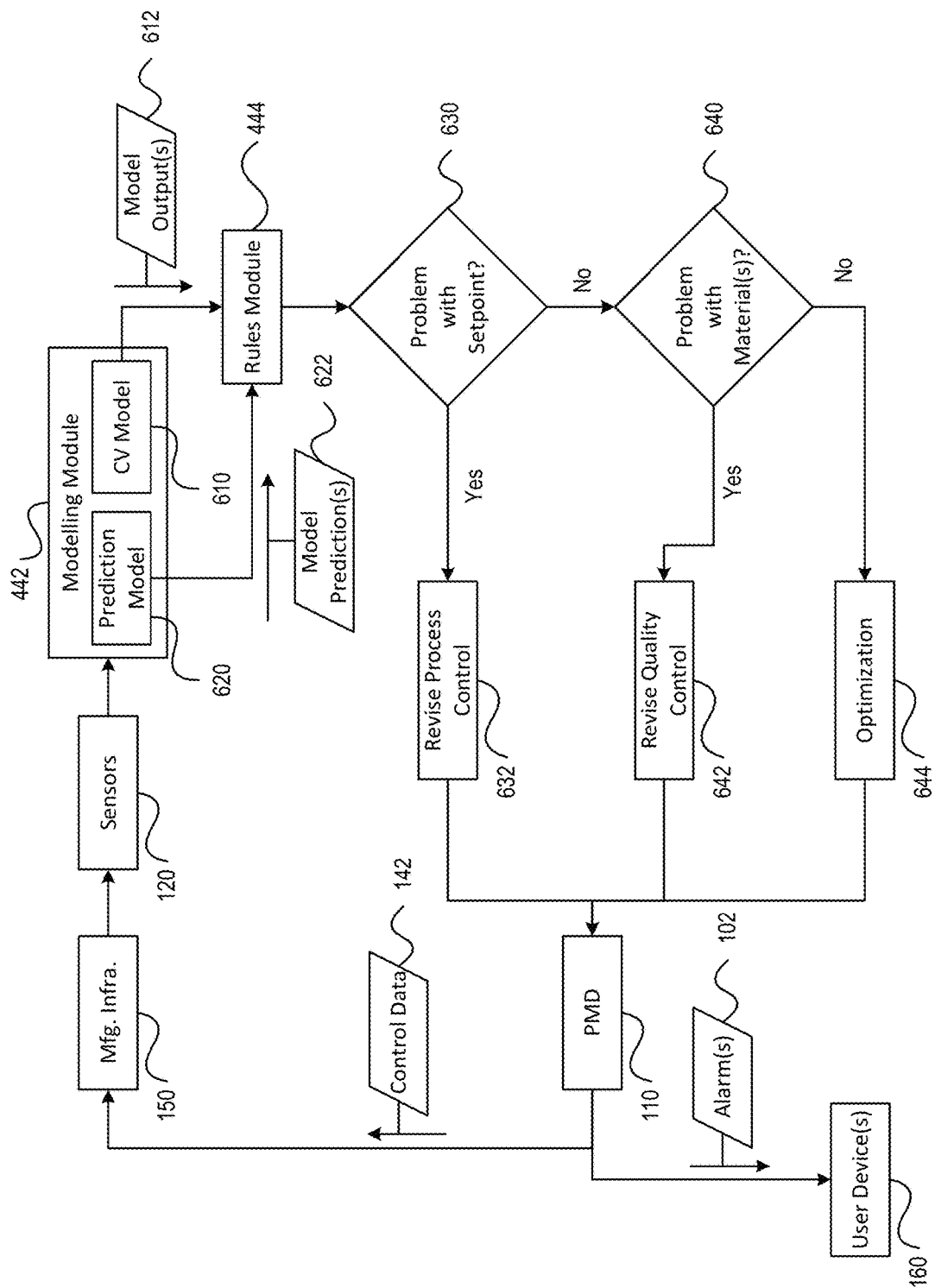
FIG. 6 is a block diagram illustrating exemplary operations for monitoring a process or system in accordance with aspects of the present disclosure.

Referring now to FIG. 6, a block diagram illustrating exemplary operations for monitoring a process or system in accordance with aspects of the present disclosure is shown. In the example shown in FIG. 6, the process monitoring device (PMD) 110 is monitoring the manufacturing infrastructure 150. During the monitoring the sensors 120 may collect sensor data (e.g., the sensor data 122 of FIG. 1, or the monitoring data 404 of FIG. 4) that may be provided to the process monitoring device 110. A portion of the sensor data may include media content (e.g., images, video, etc.) associated with the process or system being monitored. The media content may be pre-processed to prepare the media content for evaluation by the models of the modelling module 442. For example to the media content may be subject to RGB and grayscale transformations, normalization, segmentation, or processes, as described above with reference to FIG. 4.

Once processing is complete, the media content may be evaluated by a CV model 620 (e.g., the CV model described with reference to FIG. 5A) of the modelling module 442. During the evaluation, the model may detect the presence of a defect or abnormality (or the lack thereof) based on characteristics identifiable within the media content and characteristics learned during the training of the model. For example, the pre-processing of the media content may produce a set of color features representing color information derived from the media content and a set of grayscale features representing grayscale information derived from the media content. As described above, the color and grayscale features may be generated in the form of a matrix that includes a series of numeric values representing the color information and the grayscale information. The CV model 610 may be configured to detect whether any of the features derived from the media content correspond to (e.g., match to within a threshold tolerance, such as a greater than X % match, where X may be 50%, 60%, 70%, 80%, 90%, or some other tolerance value or criterion) features associated with known defects (i.e., defects learned by the model during the training), features associated with normal process outputs (i.e., no defects or abnormalities), or unknown conditions (e.g., process or system outputs that were not encountered during the training).

In addition to detecting the presence or absence of defects based on the features derived from the media content, the modelling module 442 may be configured to generate a set of predictions related to the process or system. For example, prior to a production run of the manufacturing infrastructure 150 a user may provide inputs to the user devices 160 related to a configuration of the manufacturing infrastructure 150. Non-limiting examples of the types of information that may be provided as inputs may include cooling parameters (e.g., temperatures of cooling water, etc.), material parameters (e.g., a type of metal to be cast, additives used, metal and additive quantities, etc.), mold feed rate information (e.g., how fast molten metal is fed into the manufacturing infrastructure), mold flow rate information (e.g., how fast molten metal is fed through the manufacturing infrastructure), or other types of information. In some aspects, the inputs may include other types of information, such as when the process being monitored is not a metal casting process and the system being monitored is not a metal casting infrastructure. Accordingly, it is to be understood that the specific examples disclosed herein are provided for purposes of illustrating the concepts disclosed herein, which may be readily adapted and applied to use cases other than the specific examples described herein.

The modelling module 442 may include a prediction model 620 (e.g., the prediction model described with reference to FIG. 5B) configured to analyze a portion of the inputs and predict the types of defects that are likely to occur during operation of the manufacturing infrastructure. For example, the prediction model 620 may have been trained using various types of information (e.g., the information described above with reference to FIG. 5B) and the training may have taught the model that certain combinations of the characteristics included in the input data may produce or be likely to product particular defects. The modelling module 442 may be configured to evaluate the inputs against the prediction model 620 to produce a set of predictions 622 corresponding to the types of defects expected to be present in the outputs of the current execution cycle of the process or system being monitored (e.g., the manufacturing infrastructure 150). It is noted that the prediction of the types of defects that may be encountered by the prediction model 620 may be performed prior to starting a production cycle (e.g., an execution cycle of the monitored process or system) and the identification or detection of the defects by the CV model 610 may be performed during the production cycle. Thus, the CV model 610 and the model outputs 612 may considered to be controlling with respect to determinations of whether the process or system outputs actually contain a defect. However, the outputs 612 of the CV model 610 may be used train the prediction model 620, which may improve the accuracy of the prediction model 620 over time and the improved accuracy through continued training may enhance the accuracy of the prediction model 620—possibly to a level of accuracy that may be sufficient to make alterations to the process or system prior to starting a production cycle.

The model outputs 612 and the set of predictions 622 may be provided to the rules module 444. As described above, the rules module 444 may be provided with a set of rules (e.g., the rules 416 of FIG. 4) that may be used to determine cause of the defects and abnormalities identified by the modelling module 442 and also to determine actions to mitigate the causes of those defects and abnormalities. For example, the rules module 444 may be configured to evaluate the model outputs 612 using the set of causation rules produced by the rules training module 434 of FIG. 4 to determine the causes of any defects or abnormalities included in the model outputs 612. In an aspect, the model outputs 612 may also be evaluated against the model predictions 622 to determine whether the model predictions 622 correctly predicted defects identified by the model outputs 612. Evaluating the model outputs 612 against the model predictions 622 may help detect outlier conditions where a defect is predicted by the model predictions 622 but not identified by the model outputs 612, which may indicate that the defect may have been incorrectly predicted. In such instances, when the model outputs 612 do not identify a defect but the model predictions 622 indicate a defect, the condition may be flagged for manual verification to confirm the presence or lack of a defect in the outputs of the process or system. In such instances the conditions associated with the incorrect prediction may also be flagged for use in further training of the prediction model and/or the CV model to improve the accuracy of the prediction model and/or the CV model Similarly, when the model predictions 622 include predictions that correlate to defects or abnormalities identified in the model outputs 612, the set of causation rules may be used to determine that the cause of the defect or abnormality.

By determining defect causes based on the model outputs 612, the set of causation rules may be configured to output causation predictions or determinations only for those defects or abnormalities that were predicted by the model outputs 612, which may increase the likelihood that any actions that are taken to address identified defects or abnormalities mitigate further occurrences of those defects or abnormalities and do not increase the severity of the defects or abnormalities and/or result in new defects or abnormalities. For example, if a defect is predicted by the model predictions 622 but not identified by the model outputs 612, modifying the process or system to mitigate that defect may result in a new defect or abnormality being introduced to the process or system (e.g., since the defect may have been identified in error due to the lack of a correlation of the model predictions 622 to the model outputs 612). Determining causation for defects that are identified in the model outputs 612 irrespective of whether the identified defects are predicted by the model predictions 622 may result in decreased occurrences or mitigation of the defects or abnormalities since any modifications or changes to the process or system to mitigate that defect are based on defects observed in the outputs of the process or system via the image(s) evaluated by the CV model 610. As shown above, when the model outputs 612 indicate a defect, modifications to the process or system may be made, and when the defect is only detected by the model predictions 622, modifications may not be made since the predictions included in the model outputs 622 may be less accurate than the model outputs 612. Determining modifications to the system or process in this manner may result in decreased occurrences of or elimination of the defects or abnormalities (e.g., since the modifications are based on causes of defects confirmed by the correlation between the model outputs 612 and the model predictions 622).

Once the causes of defects are determined by the causation rules, process and control rules included in the rules module 444 may be utilized to determine modifications to the process or system to mitigate further occurrences of the confirmed defects or abnormalities (e.g., defects predicted in the model predictions 622 that were also identified in the model outputs 612). For example, the process and control rules may include a rule 630 to determine if the cause of the process is related to a problem with a setpoint of the manufacturing infrastructure 150 (e.g., a temperature associated with the continuous casting process of the manufacturing infrastructure of FIG. 2). As shown in FIG. 6, if the defect is cause by a problem with the setpoint, the rule 630 may determine to revise a process control 632 that modifies a value of an operational aspect (e.g., a value of the setpoint) to a value that is predicted to mitigate further occurrences of the defect. Similarly, if the defect is not determined to be caused by a problem with the setpoint, a rule 640 may determine whether the defect is caused by the materials (e.g., quantities of a material or materials, combination of materials, etc.) and may determine a modification to the monitored process or system (e.g., the manufacturing infrastructure 150) to mitigate the defect based on whether the defect is determined to be caused by the materials. Where the defect is caused by a problem with one or more materials, the rule 640 may determine different types of actions to be taken to mitigate the defect than when the defect is caused by the setpoint. For example, the rule 640 may determine to revise a quality control aspect 642 of the process or system, such as to modify inputs (e.g., material(s), a quantity of the material(s), and the like) used by the process or system being monitored. Where the cause is not associated with the materials, the rule 640 may output optimization data 644, which may include proposed modifications for further testing or verification, such as to test and verify whether the set of optimizations result in improved performance of the process or system. It is noted that the exemplary modifications and rules-based analysis described above have been provided for purposes of illustration, rather than by way of limitation and that embodiments of the present disclosure may be configured with rule sets that are more complex than the specific examples described herein.

The outputs of the rules module 444 may be evaluated by the process monitoring device 110 to determine whether to provide control data 142 to the manufacturing infrastructure 150 (or the user device(s) 160) or to provide an alarm 102 to the user device 160. To illustrate, where the output of the rules module 444 includes revised process control data 632 (e.g., modifying the setpoint, adjusting flow rate, or other process parameters), the process monitoring device 110 may provide control data 142 configured to modify process control parameters of the manufacturing infrastructure 150. For example, the revised process control data 632 may indicate that further occurrences of a defect or abnormality may be mitigated by altering (e.g., raising or lowering) the setpoint to a particular value (or range of values). It is noted that revised process controls determined by the rules module 444 may modify other process control parameters (e.g., flow rates, temperatures, cooling parameters, and the like. Similarly, where the rules module 444 outputs revised quality control data 642, the process monitoring device 110 may transmit control data 142 to the manufacturing device 150 configured to modify one or more quality control aspects of the manufacturing infrastructure 150. To illustrate, suppose the cause of the defect was a quantity of materials used to produce the inputs to the manufacturing infrastructure (e.g., an additive used to produce the molten metal 212 of FIG. 2). In such an instance the quality control data 642 may identify modifications to the inputs used by the manufacturing infrastructure 150, such as to change the inputs to a different quantity or combination of materials. It is noted that FIG. 6 illustrates the control data 142 being sent to the manufacturing infrastructure 150 for purposes of illustration, rather than by way of limitation and that in some implementations the control data (or a portion thereof) may additionally or alternatively be transmitted to the user device 160. For example, an operator or administrator of the manufacturing infrastructure 150 may be responsible for configuring the materials used by the manufacturing infrastructure 150 or setting the quantities of materials used. In such instances, the control data 142 may be transmitted to the user device 160 to cause the user to modify the materials used by the manufacturing infrastructure 150. By utilizing the set of rules, the rules module 444 may tune the operations and/or inputs of the manufacturing infrastructure 150 to reduce or mitigate the occurrence of defects in the output of the manufacturing infrastructure 150. Moreover, because the rules are generated based on training (e.g, by the training engine 130 of FIGS. 1 and 4), the likelihood that modifications to the manufacturing infrastructure 150 based on the set of rules actually results in decreased occurrences of defects or other types of abnormalities may be increased, thereby resulting in a process or system that operates to produce outputs (e.g., the slab 202 of FIG. 2) that are free from defects or abnormalities.

In addition to providing the control data 142 based on the process control data 632 and the quality control data 642, the process monitoring device 110 may also be configured to evaluate the optimization data 644 generated by the rules module 444. As described above, the optimization data 644 may identify conditions where the model outputs 612 and the model predictions 622 are inconsistent, which may correspond outlier conditions, previously un-encountered defects or abnormalities, and the like. When such conditions occur, the process monitoring device 110 may transmit information associated with or including the optimization data 644 to the user device 160. The transmitted information may indicate that further testing and analysis may be needed to evaluate whether the optimization data 644 is associated with a defect that should be incorporated into the training of the models and rules by the training engine 130 or is just a false positive. To evaluate whether the optimization data 644 is associated with a defect, a user associated with the user device 160 may perform manual inspection (e.g., of the slab 202 of FIG. 2, etc.) of the outputs of the manufacturing infrastructure 150, testing of the outputs, request lab reports or other data pertaining to the outputs, or other operations to determine whether a defect/abnormality or a false positive has occurred. Once the analysis is complete the results may be added to the information stored at a database (e.g., the one or more databases 118 of FIG. 1) and utilized to perform further training of the models, as described with reference to FIG. 4. For example, if it is determined that no defect has occurred, the data derived from the analysis may be labeled as indicating no defect and used to train the model(s) so that similar instances may not be flagged by the training engine 130 (e.g., flagged in the model outputs 612 or the model predictions 622). In other instances, the optimization data 644 may have flagged a new type of defect or abnormality and the data derived from the analysis may be labeled with information associated with the defect so that the training engine 130 may teach the model(s) to identify and predict future occurrences of that defect and to generate rules that correctly identify the cause of the defect and how to correct it. It is noted that the process or training the model(s) to identify defects and to train causation and process control rules to correctly identify the cause of the defect and how to mitigate the defect may take some time (e.g., time to compile sufficient data for training purposes, etc.) and the ability to correctly identify/predict defects and abnormalities and determine causation/mitigation operations may improve with each new cycle of training.

It is noted that in some aspects, the rules module 444 may be configured to evaluate at least a portion of the monitored process or system (e.g., the manufacturing infrastructure 150) prior to initiating a new execution cycle (e.g., a new execution of the continuous casting process and the like). For example, prior to initiating a new execution cycle an initialization process may be performed to configured parameters of process or system being monitored. The quality control rules and process control rules of the rules module 444 may be evaluated against the parameters set during the initialization process to determine whether any of the configured parameters are known to produce defects. For example, if a quantity or ratio of materials used to produce the molten metal 212 of FIG. 2 is known to result in defects (e.g., based on the rules training) the rules module 444 may provide quality control data to the process monitoring device 110. Such quality control data may propose modifications to the quantity or ratio of materials predicted to not result in a defect. As another example, the process control parameters configured for the new execution cycle may evaluated using process control rules of the rules module 444 and may indicate that a defect is likely to occur based on the process or system operation parameters (e.g., cooling parameters, flow rate parameters, setpoint parameters, etc.), and may output revised process control data to the process monitoring device to modify the operational parameters to mitigate the defects. Additionally or alternatively, the process monitoring device 110 may generate an alarm based on the quality control rules and/or the process control rules to notify a user associated with the user device 160 that the configured parameters for the new execution cycle of the process or system may result in a defect or abnormality. Evaluating the configured parameters of execution cycles prior to execution may enable embodiments of the present disclosure to identify potential defects and abnormalities prior to initiating a process and allow the parameters to be modified to mitigate the potential defects before they occur, thereby reducing waste (e.g., time, cost, etc.) of the process or system and increasing they quality of the outputs provided as a result of the new execution cycle.

In an aspect, the process monitoring device 110 may also be configured to generate alarms 102. The alarms 102 may be provided to the user device 160, as shown in FIGS. 1 and 6, and may also be provided to other devices and systems, such as the manufacturing infrastructure 150. The alarms 102 may be associated with problem conditions detected with respect to performance and operations of the process or system being monitored. For example, using the techniques described above it may be determined that a defect is being caused by operational parameters of the manufacturing infrastructure 150 or that some of the parameters indicate unsafe operating conditions (e.g., a cooling malfunction, one of the rollers 254 has stopped, etc.) and the alarms 102 may be configured to notify a user of the cause of the alarm. It is noted that the above-described and non-limiting examples of alarms have been provided for purposes of illustration, rather than by way of limitation and that systems in accordance with aspects of the present disclosure may be configured to provide other types of alarms or trigger generation and transmission of alarms based on additional criteria other than those explicitly described herein.

Referring back to FIG. 1, as shown above, the process monitoring device 110 of embodiments may create and train models to identify defects in outputs of a process or system. The models may be configured to analyze or evaluate various types of data, including media content, to identify characteristics indicative of the presence of defects in the outputs of the system. The ability to utilize computer-vision-type techniques and data transformations to analyze media content and other sensor data using machine learning models may enable the defects to be detected much sooner than a manual inspection process, as is currently used for many processes (e.g., steel casting, cold rolling of steel, etc.). Moreover, the accuracy of the defect detection may be steadily improved over time as more training data is compiled. The training of models in accordance with the techniques disclosed herein may also allow the process monitoring device 110 to detect new or emerging defects, such as via the processes described with respect to the optimization data 644 of FIG. 6 which indicates the presence of abnormalities in the process or outputs. When such abnormalities occur, additional training may be performed to teach the model to detect further occurrences of the abnormalities. As described above with reference to FIGS. 5A-5C, the training provided by the process modelling device 110 may also establish a set of rules (e.g., causation rules and control rules) that may be used to determine the cause of a defect and provide control data configured to modify the parameters of the process (e.g., input parameters, operational parameters, etc.) to mitigate further occurrences of the defects.

During the monitoring of the process or system (e.g., the manufacturing infrastructure 150), sensor data 122 may be captured by the one or more sensors 120 and provided to the process monitoring device 110. As described with reference to FIG. 6, the sensor data may then be evaluated against the trained models to identify defects that may occur during execution of the process. As the model evaluates the sensor data 122, the defect detection/correction engine 140 may evaluate the model outputs based on the trained set of rules to determine the causes of the defects (e.g., using the causation rules) and may determine whether to modify parameters of the process (e.g., using the control rules) based on causes associated with detected defects. The defect detection/correction engine 140 may be configured to output control data 142 that includes modifications configured to mitigate further occurrences of the detected defects. For example, as described above with respect to the manufacturing infrastructure of FIG. 2, the control data 142 may be configured to modify a setpoint of a steel casting process, modify inputs to the steel casting process, modify process control parameters of the steel casting process, or other types of modifications to reduce or eliminate occurrences of defects in the slabs of steel produced by the casting process.

In addition to generating the control data 142, the process monitoring device 110 may also be configured to generate alarms 102. The alarms 102 may be transmitted to the user device(s) 160 to notify a user of certain aspects of the monitored process. For example, the alarms 102 may notify the user that a defect has occurred and that control data 142 has been issued to correct or modify the process and mitigate further occurrences of the defect. Additionally or alternatively, the alarms 102 may notify the user of the user device 160 that an error or fault has occurred in the monitored process, such as an unsafe or unstable operating state (e.g., a roller 254 of the casting process of FIG. 2 has stopped turning, a cooling system has stopped working, etc.) or for other purposes.

As shown above, the process monitoring device 110 may enable defects and abnormalities that occur in outputs of a process or system to be detected more rapidly as compared to traditional defect detection techniques. Additionally, by utilizing the causation and control rules the process monitoring device 110 may determine the causes of defects that occur and generate control data to modify the process such that the detected defects do not occur in the future. Moreover, the ability to train the various models and rules utilized by process monitoring device 110 may enable new and emerging defects to be learned and identified over time, allowing rapid correction and mitigation of such emerging defects and promoting efficient operation of the process or system. Additionally, the functionality provided by the process monitoring device 110 allows parameters of a process or system to be analyzed prior to starting a new execution cycle, such as to evaluate control parameters or input parameters to determine whether those parameters may result in a defect. This allows the process monitoring device 110 to identify defects before the process is started and the defects actually occur. In such instances the set of rules may also be used to evaluate the parameters of the process or system and make adjustments before starting the process, which may reduce waste (e.g., time, cost, etc.) and increase the quality of the outputs provided as a result of the process.

Figure 7:
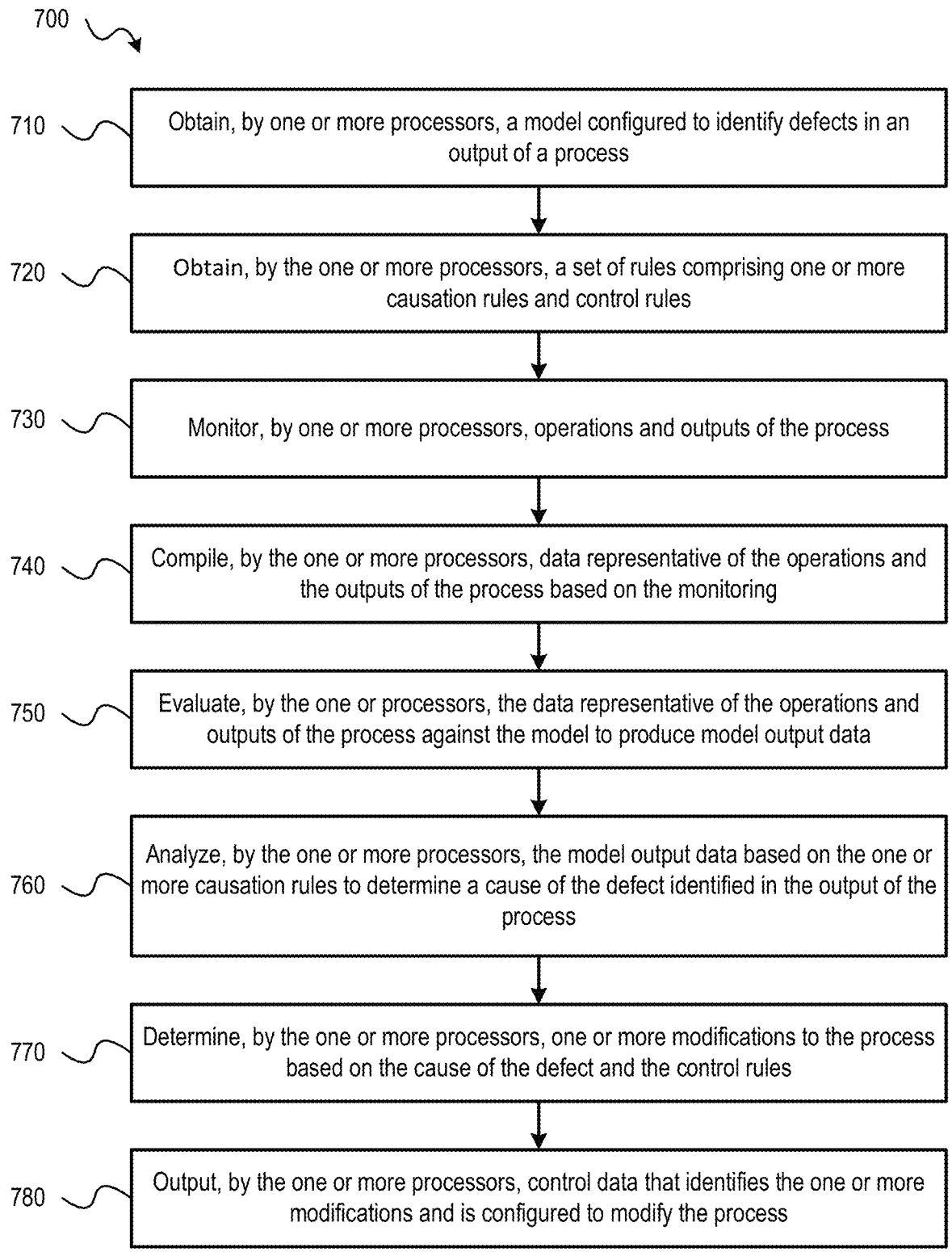
FIG. 7 is a flow diagram illustrating an example of a method for detecting and mitigating defects in a process or system according to one or more aspects of the present disclosure.

Referring to FIG. 7, a flow diagram of an example of a method for detecting and mitigating defects in a process according to one or more aspects is shown as a method 700. In some implementations, the operations of the method 700 may be stored as instructions that, when executed by one or more processors (e.g., the one or more processors 112 of the process monitoring device 110 of FIG. 1, processors of a cloud-based system, etc.), cause the one or more processors to perform the operations of the method 700. In some implementations, the method 700 may be performed by a computing device, such as the process monitoring device 110 of FIG. 1.

At step 710, the method 700 includes obtaining, by one or more processors, a model configured to identify defects in an output of a process. In an aspect, the model may be obtained or generated as described above with reference to FIGS. 1, 4, and 5A. For example, a process monitoring device may compile a dataset that may include at least historical information (e.g., the historical data 414 of FIG. 4, such as historical sensor data, historical defect data, historical process input data, and the like) associated with previous execution cycles of the process and outputs of the previous execution cycles of the process. The dataset may additionally include structured data (e.g., the structured data 410 of FIG. 4), unstructured data (e.g., the unstructured data 412 of FIG. 4), lab reports, or other types of data. Once the dataset has been compiled, the dataset may be used to train the model. As described with reference to FIG. 5A-5C, training the model may include: labelling at least a portion of the dataset; transforming the dataset (e.g., via the RGB and grayscale transform logic 506, 508) to a format that may be ingested into the model; background segmentation of media content included in the dataset; normalization of the dataset; shuffling the dataset; and splitting at least the portion of the dataset to produce a split dataset comprising training data, validation data, and testing data. Once the split dataset has been created, the model may be trained using the training data and validated based on the validation data, as described with reference to FIG. 5A-5C. Hyper parameters of the model may be tuned, and the model may be finalized based on the validation to produce a tuned model, which may be provided to a defect detect/correction engine (e.g., the defect detection/correction engine 140 of FIGS. 1, 4, and 6).

In an aspect, training the model may also include predicting defects based on the testing data and evaluating performance of the model based on the predicted defects. A determination to revise or finalize the model may be made based on the performance of the model. For example, where the performance of the model satisfies a threshold performance level (e.g., 80%, 85%, 90%, 95%, etc.) with respect to correctly identifying defect, the model may be finalized for use by the defect detection/correction engine. Where the model does not satisfy the threshold performance level (e.g., performance is less than the threshold performance level or less than or equal to the threshold performance level), the model may be revised (e.g., the dataset may be shuffled, re-split into the split dataset, and retrained. The retraining and revising of the model may continue until the model satisfies the threshold performance level (e.g., performance is greater than or equal to the threshold performance level or greater than the threshold performance level). In some aspects, a prediction model configured to predict the types of outputs expected to occur for a particular execution cycle of the process contain a defect may also be generated, as described above. As explained with reference to FIGS. 2 and 3, for a steel manufacturing process the model may be trained to detect various types of defects within the steel produced by the manufacturing process, including but not limited to: pitted defects, inclusion defects, rolled in scale defects, sliver defects, patches defects, crazing defects, scratches defects, and scab defects.

At step 720, the method 700 includes creating, by the one or more processors, a set of rules comprising one or more causation rules and control rules. As described above, the one or more causation rules may be configured to determine or identify a cause of a defect identified in the outputs of the process (e.g., a defect in a slab or piece of steel generated via a casting process, etc.) and the one or more control rules may be configured to modify the process (e.g., modify process control parameters, process input or material parameters, and the like) to mitigate occurrences of the defect. In an aspect, a training process may be used to create the rule set, as described above. Training the causation rules and the control rules may be based on the compiled dataset or a portion of the dataset, such as lab reports or input parameters and control parameters of the process. During the training the causation rules and the control rules may be validated, which includes determining whether the causation rules correctly determine a cause of the defects in the outputs of the process and whether the control rules actually mitigate future occurrences of the defects in the outputs of the process. Causation rules that correctly determine the cause of the defects in the outputs of the process and control rules that actually mitigate future occurrences of the defects in the outputs of the process may be incorporated into a set of rules that may be used to analyze and mitigate defects during monitoring of a live process or system (e.g., a non-training cycle of the process or system).

The method 700 includes, at step 730, monitoring, by one or more processors, and at step 740, compiling, by the one or more processors, data representative of the operations and the outputs of the process based on the monitoring. As described above, one or more sensors may be used to capture information associated with the operations of the process and/or the outputs of the process during the monitoring. For example, the sensors may be the sensors 120 of FIGS. 1, 4, and 6 or the sensors 260, 262, 264 of FIG. 2 and may include temperature sensors, cameras (e.g., imaging cameras, video cameras, etc.), or other types of sensors operable to capture information that may be used to evaluate a process.

At step 750, the method 700 includes evaluating, by the one or processors, the data representative of the operations and outputs of the process against the model to produce model output data. In an aspect, the model output data may be the model outputs 612 of FIG. 6 and may be generated by a CV model (e.g., the CV model 610 of FIG. 6). As described above, the model output data may include information indicating a defect identified in the output of the process. As described with reference to FIG. 5A, a portion of the dataset used to train the CV model may include media content (e.g., image and/or video information captured by the sensor(s)) depicting the outputs of the process, such as media content associated with the slab 202 of FIG. 2, as described above with reference to FIG. 5B. A labelling process may be used to apply labels to the media content and each label may indicate whether a corresponding piece of media content depicts a particular output of the process (e.g., a particular slab produced by the manufacturing infrastructure of FIG. 2) that contains a defect (e.g., a defect label) or does not contain a defect (e.g., a no-defect present label). The labels may be utilized by the model to learn to identify at defects present with respect to the outputs of the process based on analysis of the media content. To illustrate and as described above with reference to FIG. 5A, one or more transforms of the media content may be performed (e.g., by the RGB transform logic 506 and the grayscale transform logic 508 of FIG. 5A) to translate the media content into a format ingestible by the model, such as a matrix or other data structure of numeric values representing the information depicted in the media content. The model may be configured to detect defects based on characteristics included in the translated media content, such as characteristics that may be identified based on color information in the translated media content (e.g., based on translated media content produced by the RGB transform logic), contrast information in the translated media content (e.g., based on translated media content produced by the grayscale transform logic), or both. In an aspect and as described above with reference to FIGS. 5B and 6, the method 700 may also include evaluating input and control parameters of the process to predict defects using a prediction model to generate prediction data (e.g., the prediction data 622 of FIG. 6) that includes predictions of the types of defects expected to be present in the outputs of the process. In an aspect, information associated with the impact and the severity of defects identified by the CV model may also be provided. For example, the image analysis may enable the size of the defect to be determined, the depth of the defect to be determined, or other types of quantitative indications of the impact and severity of the defect.

At step 760, the method 700 includes analyzing, by the one or more processors, the model output data (e.g., the outputs of the CV model) based on the one or more causation rules to determine a cause of the defect identified in the output of the process. As described above with reference to the rules module 444 of FIGS. 4 and 6, the causation rules may be configured to identify causes of defects identified in the outputs of the model, such as defects caused by inputs to the process (e.g., materials used to produce molten metal used to produce the steel) as well as defects caused by process control parameters (e.g., temperature or cooling parameters, flow parameters, setpoint parameters, and the like). It is noted that while exemplary causes of defects with respect to a steel casting process have been described herein, aspects of the present disclosure may be readily adapted to identify causes of defects in other types of processes and systems. Accordingly, it is to be understood that the concepts of the present disclosure should not be limited to the specific and non-limiting examples related to a steel casting process disclosed herein. It is noted that the model predictions may be used to identify outlier conditions (e.g., conditions where the prediction outputs indicate an expected defect that was not confirmed by the CV model outputs) that may be used to perform further training and/or manual defect verification.

At step 770, the method 700 includes determining, by the one or more processors, one or more modifications to the process based on the cause of the defect and the control rules. As described above, the one or more modifications to the process determined by the control rules may be configured to mitigate future occurrences of the defect. For example, the one or more modifications may be configured to modify a continuous casting process to eliminate occurrences of the defects in subsequently generated pieces of steel, such as by implementing quality control modifications configured to modify materials used to produce molten metal used to produce the pieces of steel (e.g., where the cause of a defect is based on process inputs), process control modifications configured to modify process control parameters of the continuous casting process (e.g., where the cause of a defect is based on process parameters), or both.

At step 780, the method 700 includes outputting, by the one or more processors, control data that identifies the one or more modifications and is configured to modify the process. As described above, the control data (e.g., the control data 142 of FIGS. 1 and 6) may be provided to a manufacturing infrastructure (or another type of process or system) to implement process control parameters automatically (e.g., by adjusting flow rate parameters, temperature or cooling parameters, setpoint parameters, etc.) or manually (e.g., by transmitting the control data to a user device to inform the user of the modifications to be made to eliminate defects). As shown above, monitoring a process or system using systems and devices operating in accordance with embodiments of the present disclosure may enable defects and abnormalities that occur in outputs of a process or system to be detected more rapidly as compared to traditional defect detection techniques. Additionally, utilizing the causation and control rules of embodiments enables causes of detected defects to be identified and control data to be determined for modifying the process such that the detected defects do not occur in the future. Moreover, the ability to train the various models and rules utilized by embodiments may enable new and emerging defects to be learned and identified over time, allowing rapid correct and mitigation of such emerging defects and promoting efficient operation of the process or system. Additionally, aspects of the present disclosure may also allow a process or system to be analyzed prior to starting a new execution cycle, such as to evaluate control parameters or input parameters to determine whether those parameters may result in a defect. This allows defects to be identified before the defects actually occur and the parameters of the process or system to be adjusted before starting the new execution cycle, thereby reducing waste (e.g., time, cost, etc.) of the process or system and increasing they quality of the outputs provided as a result of the new execution cycle.

It is noted that other types of devices and functionality may be provided according to aspects of the present disclosure and discussion of specific devices and functionality herein have been provided for purposes of illustration, rather than by way of limitation. It is noted that the operations of the method 700 of FIG. 7 may be performed in any order, or that operations of one method may be performed during performance of another method including one or more operations of the method 700 of FIG. 7. It is also noted that the method 700 of FIG. 7 may also include other functionality or operations consistent with the description of the operations of the system 100 of FIG. 1 and the concepts described and illustrated with reference to FIGS. 2-6.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include RAM, ROM, EPROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:
   obtaining, by one or more processors, a machine learning model configured to identify defects in an output of a steel manufacturing process, wherein obtaining the machine learning model comprises:
     training the machine learning model based on training data;
     validating the machine learning model based on validation data;
     tuning hyper parameters of the machine learning model based on the validation to produce a tuned model;
     predicting defects with the tuned model based on testing data; and
     evaluating performance of the tuned model based on the predicted defects;
   obtaining, by the one or more processors, a set of rules comprising one or more causation rules and control rules, the one or more causation rules configured to determine a cause of a defect identified in the outputs of the steel manufacturing process and the one or more control rules configured to modify the steel manufacturing process to mitigate occurrences of the defect;
   monitoring, by one or more processors, operations and outputs of the steel manufacturing process;

compiling, by the one or more processors, data representative of the operations and the outputs of the steel manufacturing process based on the monitoring;

evaluating, by the one or more processors, the data representative of the operations and outputs of the steel manufacturing process against the machine learning model to produce model output data, wherein the model output data includes information indicating a defect identified in the output of the steel manufacturing process;

analyzing, by the one or more processors, the model output data based on the one or more causation rules to determine a cause of the defect identified in the output of the steel manufacturing process;

determining, by the one or more processors, one or more modifications to the steel manufacturing process based on the cause of the defect and the control rules, wherein the one or more modifications to the steel manufacturing process are configured to mitigate future occurrences of the defect in subsequent outputs of the steel manufacturing process; and outputting, by the one or more processors, control data that identifies the one or more modifications and is configured to modify the steel manufacturing process.

2. The method of claim 1, further comprising generating, by one or more sensors, sensor data based on the monitoring, the sensor data comprising information associated with the operations and the outputs of the steel manufacturing process, wherein the data representative of the operations and outputs of the steel manufacturing process comprises the sensor data.

3. The method of claim 2, wherein the sensor data comprises at least media content depicting the outputs of the steel manufacturing process, the method further comprising:

executing one or more transforms of the media content, wherein each of the transforms is configured to translate the media content into a format ingestible by the machine learning model, and wherein the machine learning model is configured to detect defects depicted in the machine learning model based on characteristics of the outputs of the steel manufacturing process included in the translated media content.

4. The method of claim 3, wherein the machine learning model is configured to detect the characteristics of the outputs of the steel manufacturing process based on color information in the translated media content, contrast information in the translated media content, or both.

5. The method of claim 1, wherein obtaining the machine learning model comprises:

compiling a dataset comprising at least historical information associated with previous execution cycles of the steel manufacturing process and outputs of the previous execution cycles of the steel manufacturing process;

training the machine learning model based on the dataset, wherein the training comprises:

labelling at least a portion of the dataset;

splitting at least the portion of the dataset to produce a split dataset comprising the training data, the validation data, and the testing data; and determining to revise or finalize the machine learning model based on the performance of the tuned model, wherein revising the machine learning model comprises performing additional training.

6. The method of claim 5, wherein the at least a portion of the dataset corresponds to media content depicting the outputs of the steel manufacturing process, wherein the labelling comprises applying labels to the media content, wherein each label indicates whether a corresponding piece of media content of the media content depicts a particular output of the steel manufacturing process that contains a defect or does not contain a defect, and wherein the labels are configured teach the machine learning model to identify at least a portion of the defects detectable within the outputs of the steel manufacturing process based on analysis of the media content.

7. The method of claim 5, further comprising generating a prediction model configured to predict whether outputs of a particular execution cycle of the steel manufacturing process contain defects, wherein the predicting is based on the prediction model, and wherein the performance of the tuned model is evaluated based on whether the prediction model correctly identifies outputs of the steel manufacturing process containing defects and outputs of the steel manufacturing process that do not contain defects.

8. The method of claim 5, further comprising shuffling the dataset to produce at least the portion of the dataset, wherein the dataset is shuffled prior to each training cycle of the machine learning model, and wherein a new training cycle of the machine learning model is initiated subsequent to the evaluating of the performance of the tuned model until the machine learning model satisfies a threshold performance.

9. The method of claim 1, wherein obtaining the set of rules comprises:

creating each causation rule of the causation rules and each control rule of the control rules;

training, by a rules training module, the causation rules and the control rules based on a training dataset;

validating the causation rules and the control rules, wherein the validating comprises:

determining whether the causation rules correctly determine a cause of the defects in the outputs of the steel manufacturing process; and determining whether the control rules actually mitigate future occurrences of the defects in the outputs of the steel manufacturing process; and allocating causation rules that correctly determine the cause of the defects in the outputs of the steel manufacturing process and control rules that actually mitigate future occurrences of the defects in the outputs of the steel manufacturing process to the set of rules.

10. The method of claim 1, wherein the steel manufacturing process is a continuous casting process and the outputs of the steel manufacturing process comprise pieces of steel, and wherein the machine learning model is configured to detect defects selected from the list consisting of: a pitted defect, an inclusion defect, a rolled in scale defect, a sliver defect, a patches defect, a crazing defect, a scratches defect, and a scab defect.

11. The method of claim 10, wherein the one or more modifications are configured to modify the continuous casting process to eliminate occurrences of the defects in subsequently generated pieces of steel, the one or more modifications comprising quality control modifications configured to modify materials used to produce molten metal used to produce the pieces of steel via the continuous casting process, process control modifications configured to modify process control parameters of the continuous casting process, or both.

12. A system for mitigating occurrences of defects in a steel manufacturing process, the system comprising:
one or more sensors;
a memory; and
one or more processors communicatively coupled to the memory and the one or more sensors, the one or more processors configured to:
generate a machine learning model configured to identify defects associated with pieces of steel produced by the steel manufacturing process and store the machine learning model at the memory, wherein generating the machine learning model comprises:
training the machine learning model based on training data;
validating the machine learning model based on validation data;
tuning hyper parameters of the machine learning model based on the validation to produce a tuned model;
predicting defects with the tuned model based on testing data; and
evaluating performance of the tuned model based on the predicted defects;
create a set of rules comprising one or more causation rules and one or more control rules and store the set of rules at the memory, the one or more causation rules configured to determine a cause of a defect identified in the pieces of steel produced by the steel manufacturing process and the one or more control rules configured to modify the steel manufacturing process to mitigate occurrences of the defect;
monitor the steel manufacturing process based at least in part on the one or more sensors;
compile data representative of operations of the steel manufacturing process and a generated piece of steel produced by the steel manufacturing process based on the monitoring;
evaluate the data representative of the operations of the steel manufacturing process and the generated piece of steel produced by the steel manufacturing process against the machine learning model stored at the memory to produce model output data that includes information indicating a defect identified in the generated piece of steel produced by the steel manufacturing process;
analyze the model output data based on the one or more causation rules stored at the memory to determine a cause of the defect identified in the generated piece of steel produced by the steel manufacturing process;
determine one or more modifications to the steel manufacturing process based on the cause of the defect and the control rules stored at the memory, wherein the one or more modifications to the steel manufacturing process are configured to mitigate future occurrences of the defect in subsequently generated pieces of steel; and
output control data that identifies the one or more modifications and is configured to modify the steel manufacturing process.

13. The system of claim 12, wherein the one or more sensors are configured to generate, based on the monitoring, sensor data comprising at least media content depicting the generated piece of steel, and wherein the one or more processors are configured to execute one or more transforms of the media content, wherein each of the transforms is configured to translate the media content into a format ingestible by the machine learning model, and wherein the machine learning model is configured to detect defects depicted in the machine learning model based on characteristics of the generated piece of steel included in the translated media content.

14. The system of claim 13, wherein the characteristics of the generated piece of steel are identified by the machine learning model based on color information in the translated media content, contrast information in the translated media content, or both.

15. The system of claim 12, wherein the one or more processors are configured to generate the machine learning model by:
compiling a dataset comprising at least historical information associated with previous execution cycles of the steel manufacturing process and pieces of steel produced during the previous execution cycles of the steel manufacturing process;
training the machine learning model based on the dataset, wherein the training comprises:
applying labels to at least a portion of the dataset, wherein the labels indicate whether different data of at least the portion of the dataset are associated with a particular piece of steel that contains a defect or does not contain a defect, and wherein the defects associated with the labels are selected from the list consisting of: a pitted defect, an inclusion defect, a rolled in scale defect, a sliver defect, a patches defect, a crazing defect, a scratches defect, and a scab defect;
splitting at least the portion of the dataset to produce a split dataset comprising the training data, the validation data, and the testing data;
and
determining to revise or finalize the machine learning model based on the performance of the tuned model, wherein revising the machine learning model comprises performing additional training.

16. The system of claim 15, wherein the at least a portion of the dataset corresponds to media content depicting the pieces of steel produced by the steel manufacturing process, and wherein the labelling comprises applying labels to the media content, wherein each label indicates whether a corresponding piece of media content of the media content depicts an output of the steel manufacturing process that contains a defect or an output of the steel manufacturing process that does not contain a defect, and wherein the labels are configured teach the machine learning model to identify the defects in the generated piece of steel based on analysis of the media content.

17. The system of claim 12, wherein the one or more processors are configured to create the set of rules by:
creating each causation rule of the causation rules and each control rule of the control rules;
training the causation rules and the control rules based on a training dataset;
validating the causation rules and the control rules, wherein the validating comprises:
determining whether the causation rules correctly determine a cause of the defects in the outputs of the steel manufacturing process; and
determining whether the control rules actually mitigate future occurrences of the defects in the outputs of the steel manufacturing process; and
allocating causation rules that correctly determine the cause of the defects in the pieces of steel produced by the steel manufacturing process and control rules that actually mitigate future occurrences of the defects in the pieces of steel produced by the steel manufacturing process to the set of rules.

18. A non-transitory computer-readable storage medium storing instructions that, when executed by one or more processors, cause the one or more processors to perform operations for mitigating defects in a steel manufacturing process, the operations comprising:
generating a machine learning model configured to identify defects associated with pieces of steel produced by the steel manufacturing process, wherein generating the machine learning model comprises:
training the machine learning model based on training data;
validating the machine learning model based on validation data;
tuning hyper parameters of the machine learning model based on the validation to produce a tuned model;
predicting defects with the tuned model based on testing data; and
evaluating performance of the tuned model based on the predicted defects;
creating a set of rules comprising one or more causation rules and control rules, the one or more causation rules configured to determine a cause of a defect identified in the pieces of steel produced by the steel manufacturing process and the one or more control rules configured to modify the steel manufacturing process to mitigate occurrences of the defect;
monitoring the steel manufacturing process;
compiling data representative of operations of the steel manufacturing process and a generated piece of steel produced by the steel manufacturing process based on the monitoring, wherein the data representative of operations of the steel manufacturing process and the generated piece of steel comprises sensor data provided by one or more sensors;
evaluating the data representative of the operations of the steel manufacturing process and the generated piece of steel produced by the steel manufacturing process against the machine learning model to produce model output data that includes information indicating a defect identified in the generated piece of steel produced by the steel manufacturing process;
analyzing the model output data based on the one or more causation rules to determine a cause of the defect identified in the generated piece of steel produced by the steel manufacturing process;
determining one or more modifications to the steel manufacturing process based on the cause of the defect and the control rules, wherein the one or more modifications to the steel manufacturing process are configured to mitigate future occurrences of the defect in subsequently generated pieces of steel; and
outputting control data that identifies the one or more modifications and is configured to modify the steel manufacturing process.

19. The non-transitory computer-readable storage medium of claim 18, the operations comprising:
receiving, from one or more sensors based on the monitoring, sensor data comprising at least media content depicting the piece of steel, wherein the one or more processors are configured to execute one or more transforms of the media content, wherein each of the transforms is configured to translate the media content into a format ingestible by the model, and wherein the model is configured to detect defects depicted in the model based on color information in the translated media content, contrast information in the translated media content, or both; and
wherein the operations to generate the machine learning model comprise:
compiling a dataset comprising at least historical information associated with previous execution cycles of the steel manufacturing process and pieces of steel produced during the previous execution cycles of the steel manufacturing process;
training the machine learning model based on the dataset, wherein the training comprises:
applying labels to at least a portion of the dataset, where at least the portion of the dataset comprises the media content, wherein the labels indicate whether a particular piece of steel associated with at least the portion of the dataset contains a defect or does not contain a defect, and wherein the defects associated with the labels are selected from the list consisting of: a pitted defect, an inclusion defect, a rolled in scale defect, a sliver defect, a patches defect, a crazing defect, a scratches defect, and a scab defect;
splitting at least the portion of the dataset to produce a split dataset comprising the training data, the validation data, and the testing data;
training the machine learning model based on the training data;
validating the machine learning model based on the validation data;
tuning hyper parameters of the machine learning model based on the validation to produce a tuned model;
predicting defects based on the testing data; and
evaluating performance of the tuned model based on the predicted defects; and
determining to revise or finalize the machine learning model based on the performance of the tuned model, wherein revising the machine learning model comprises performing additional training.

20. The system of claim 12, wherein the machine learning model includes a neural network.

* * * * *